(12) United States Patent
O'Mahony et al.

(10) Patent No.: US 11,994,941 B2
(45) Date of Patent: May 28, 2024

(54) ANALYSIS AND REMEDIATION OF ALERTS

(71) Applicant: Dell Products L.P., Hopkinton, MA (US)

(72) Inventors: Lisa O'Mahony, Cork (IE); David P. Moloney, Cork (IE); Francisco Jaen, Cork (IE); Eileen Kelleher, Wilton (IE)

(73) Assignee: Dell Products L.P., Hopkinton, MA (US)

( * ) Notice: Subject to any disclaimer, the term of this patent is extended or adjusted under 35 U.S.C. 154(b) by 23 days.

(21) Appl. No.: 17/483,007

(22) Filed: Sep. 23, 2021

(65) Prior Publication Data

US 2023/0086541 A1    Mar. 23, 2023

(51) Int. Cl.
| | |
|---|---|
| *G06F 11/07* | (2006.01) |
| *G06F 11/30* | (2006.01) |
| *G06F 18/21* | (2023.01) |
| *G06F 18/214* | (2023.01) |
| *G06F 18/243* | (2023.01) |
| *G06N 20/00* | (2019.01) |

(52) U.S. Cl.
CPC ...... *G06F 11/0793* (2013.01); *G06F 11/0772* (2013.01); *G06F 11/079* (2013.01); *G06F 11/3034* (2013.01); *G06F 18/214* (2023.01); *G06F 18/2178* (2023.01); *G06F 18/24323* (2023.01); *G06N 20/00* (2019.01)

(58) Field of Classification Search
CPC .............. G06F 11/0793; G06F 11/079; G06F 11/3034; G06F 11/3447; G06F 11/3452; G06F 11/0727
See application file for complete search history.

(56) References Cited

U.S. PATENT DOCUMENTS

| | | | |
|---|---|---|---|
| 8,095,938 B1 * | 1/2012 | Xie ..................... | G06F 11/3409 719/318 |
| 2005/0086646 A1 * | 4/2005 | Zahavi ............... | G06F 11/3485 717/124 |
| 2017/0161127 A1 * | 6/2017 | Neuvirth-Telem ......................... G06F 11/3495 | |
| 2019/0386759 A1 * | 12/2019 | Singh .................... | H04B 17/27 |
| 2020/0099709 A1 * | 3/2020 | Vasseur .............. | H04L 41/0893 |
| 2021/0034994 A1 * | 2/2021 | Stocker .................. | G06N 5/04 |
| 2021/0312277 A1 * | 10/2021 | Prabhudesai .......... | G06F 9/505 |
| 2022/0066852 A1 * | 3/2022 | Ramanujan ......... | G06F 11/0793 |

(Continued)

*Primary Examiner* — Yolanda L Wilson
(74) *Attorney, Agent, or Firm* — Muirhead and Saturnelli, LLC

(57) ABSTRACT

A cause analysis and remediation engine (CARE) can perform an analysis of inputs characterizing aspects of the system at the time an alert is generated in order to determine causes and remediation actions for the alert. The CARE can automatically detect and analyze inputs including configuration information, compliance information, and workload and performance information to determine one or more expected causes of the alert and one or more corresponding remediations that can be taken. The CARE can include a rules engine and a remediation service. The rules engine can include one or more trained models, such as trained machine learning models, each using rules to recognize inputs denoting a particular expected cause of the alert. The models can be decision trees trained using supervised learning. The remediation service can map one or more expected causes determined by the rules engine to the one or more corresponding remediations.

18 Claims, 16 Drawing Sheets

(56) References Cited

U.S. PATENT DOCUMENTS

2022/0318082 A1\* 10/2022 Slinger ................. G06F 11/327
2022/0334914 A1\* 10/2022 Kanai ................. G06F 11/0793

\* cited by examiner

Related Storage Groups- SG1

| Time Frame<br>Last 4 hours(Diagnostic) | Start<br>2019-10-23 12:00 PM | | End<br>2019-10-23 4:00 PM |
|---|---|---|---|
| Storage Group Name<br>1212a | Response Time (ms)<br>1212b | IOs/sec (IOPS)<br>1212c | MBs/sec<br>1212d |
| SG2 | 15.94 | 1562.5 | 369.0 |
| SG3 | 0.39 | 500.0 | 175.0 |
| SG5 | 0.1 | 0.9 | 0.1 |
| SG7 | 0.2 | 0.1 | 0.1 |
| SG10 | 0.2 | 0.1 | 0.1 |
| SG55 | 0.2 | 0.1 | 0.1 |
| SG13 | 0.2 | 0.1 | 0.1 |
| SG76 | 0.2 | 0.1 | 0.1 |
| SG14 | 0.2 | 0.1 | 0.1 |
| SG88 | 0.2 | 0.1 | 0.1 |
| SG9 | 0.2 | 0.1 | 0.1 |

Related FA Directors and Ports- SG1
1222

| Time Frame | Start | End |
|---|---|---|
| Last 4 hours(Diagnostic) | 2019-10-23 12:00 PM | 2019-10-23 4:00 PM |

Related FA Directors 1224

| Name 1224a | % Utilization 1224b | Queue Depth 1224c |
|---|---|---|
| FA-1D | 22.2 | 6.4 |
| FA-3D | 2.7 | 4.5 |

1225
1226

Related FA Ports 1227

| Name 1227a | % Utilization 1227b | IOPS 1227c |
|---|---|---|
| FA-1D:4 | 93.0 | 1.2 |
| FA-3D:4 | 3.0 | 1.1 |

QOS Impact Remediation

Cause: SG1 has a Silver Service Level. SG1's RT is being impacted by the following other storage groups at a higher Diamond level:

| Storage Group Name | Service Level | RT (ms) |
|---|---|---|
| SG2 | Diamond | 15.94 |
| SG3 | Diamond | 0.39 |

Remediation:
1. Consider moving SG1 to a higher service level such as Gold, Platinum or Diamond.
How to apply: The following is the REST API call to set the Service Level for an SG. Please complete the required fields with the storage group name and desired SLO/Service Level:

https:// 99.76.65.101:700/restapi/xxx/datastoragesystemXYZ/storagegroup/<*storage Group Name*>

```
{
  "editStorageGroupActionParam": {
  "editStorageGroupSLOParam": {
  "slold": < enter SLO here >
```

2. Consider tuning the Service Level of other storage groups such as SG2 and SG3.

Resource Contention Remediation
Cause: The following FA port used by SG1 has a high utilization indicating that the FA port is overloaded.

| FA Port | %Utilization |
|---------|--------------|
| FA:1D:4 | 93 |

1720

Remediation :
Consider adding a less utilized FA port to the TPG (target port group) used by SG1. These are the least busy FA ports:

| FA port | % Utilization |
|---------|---------------|
| P1 | 0.0 |
| P3 | 0.5 |
| P4 | 4.0 |

How to apply : The following is the REST API call to add an FA port to an existing TPG. Please complete the required fields with the TPG ID or name, and the director ID and port number associated with the FA port added:

1722

```
https:// 99.76.65.101:700/restapi/xxx/datastoragesystemXYZ/storagegroup/<storage Group Name>
{
  "editStorageGroupActionParam": {
    "addPortParam": {
      "port": [
        {
          "directorId": <enter the director id>,
          "portId": <enter the port number>
        }
      ]
    }
  }
}
```

FIG. 16

ANALYSIS AND REMEDIATION OF ALERTS

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein include a computer-implemented method, a system and a non-transitory computer readable medium. The system includes one or more processors, and a memory comprising code that, when executed, performs the method. The non-transitory computer readable medium includes code stored thereon that, when executed, performs the method. The method comprises: receiving notification of an alert regarding an entity in a system; responsive to receiving the notification, determining one or more expected causes of the alert in accordance with one or more rules and in accordance with an input including one or more metrics characterizing any of quality of service, performance, resource usage and workload of one or more of entities of the system; and determining one or more remediations in accordance with the one or more expected causes of the alert, wherein the one or more remediations denote one or more corresponding actions that alleviate or remove the one or more expected causes of the alert.

In at least one embodiment, determining the one or more expected causes can be performed by a classification engine that uses the one or more rules to classify the alert into one or more classifications each indicating one of the one or more expected causes of the alert. Determining the one or more remediations can be performed by a remediation service that maps the one or more expected causes to the one or more remediations.

In at least one embodiment, the entity can be one of a physical entity of the system or a logical entity of the system, and the method can further include generating the alert which indicates that a specified metric for the entity does not meet one or more specified conditions. The alert can be a performance alert for the entity, wherein the entity can be a storage group of one or more logical devices, and wherein the method can further include: determining that a current value of the specified metric for the storage group violates a specified performance target of the storage group; and responsive to determining that the current value of the specified metric for the storage group violates the specified performance target of the storage group, performing said generating the alert. The specified metric can be I/O response time. Processing can include: performing anomaly detection on the alert to determine whether the alert indicates a first anomaly with respect to historical data for the specified metric for the entity; responsive to determining that the alert indicates the first anomaly with respect to the historical data for the specified metric for the entity, performing said generating said notification of the alert; and responsive to determining that the alert does not indicate the first anomaly with respect to the historical data for the specified metric for the entity, determining not to generate said notification of the alert.

In at least one embodiment, the classification engine includes one or more machine learning models trained to classify the input into one or more classifications denoting one or more expected causes of alerts, and wherein each of the one or more machine learning models is trained to determine whether or not information included in the input denotes a corresponding one of the one or more expected causes of alerts. Each of the one or more machine learning models can be a decision tree including one or more rules that determine whether information included in the input denotes a corresponding one of the one or more expected causes of alerts.

In at least one embodiment, the input can further include configuration information describing resources of the system configured for use by each entity of the system. The configuration information can include information identifying one or more shared resource of the system where each of the one or more shared resources are configured for use by two or more entities of the system. The one or more metrics can include a first set of one or more I/O workload metrics regarding a second entity related to the entity where the configuration information can indicate that the second entity shares at least one resource with the entity. The one or more machine learning models can include a machine learning model that performs processing that determines which alerts are caused by a noisy neighbor which shares resources with one or more other entities in the system, wherein the processing performed by the machine learning model can include: determining, in accordance with the first set of one or more I/O workload metrics and the configuration information, whether the second entity is a noisy neighbor of the entity having the alert; responsive to determining that the second entity is a noisy neighbor of the entity, determining that the second entity has an associated I/O workload, as characterized by the first set of one or more I/O workload metrics, which is an expected cause of the alert of the entity; and responsive to determining that the second entity is not a noisy neighbor of the entity, determining that the second entity does not have an associated I/O workload, as characterized by the first set of one or more I/O workload metrics, which is an expected cause of the alert of the entity. The second entity can be determined to be a noisy neighbor of the entity, and the method can include determining a first of the one or more remediations that includes specifying a first resource limit for the second entity, wherein the first resource limit specifies a maximum resource consumption limit for the second entity regarding one or more resources including at least one resource shared by at least the entity and the second entity. The one or more I/O workload metrics of the first set characterizing the second entity can include one or more of: an I/O operation throughput rate and a data throughput rate.

In at least one embodiment, the input can further include configuration information describing resources of the system configured for use by each entity of the system. The configuration information can include information identifying one or more shared resource of the system where each of the one or more shared resources can be configured for use by two or more entities of the system. The one or more metrics can include a first set of one or more metrics regarding a first of the shared resources which is shared by the entity and at least one other entity, wherein the first set or one or more metrics can characterize one or more of: resource usage of the first shared resource and workload of the first shared resource. The one or more machine learning models can include a machine learning model that performs processing that determines which alerts are caused by a resource contention in the system, where the processing performed by the machine learning model can include: determining, in accordance with the first set of one or more metrics and the configuration information, whether there is a first resource contention for the first shared resource between the entity and at least one other entity sharing the first shared resource; responsive to determining that there is the first resource contention for the first shared resource between the entity and at least one other entity sharing the first shared resource, determining that the first resource contention for the first shared resource is an expected cause of the alert of the entity; and responsive to determining that there is no resource contention for the first shared resource between the entity and at least one other entity sharing the first shared resource, determining that the first resource contention for the first shared resource is not an expected cause of the alert of the entity. The first resource contention for the first shared resource, between the entity and at least one other entity sharing the first shared resource, can be determined to be an expected cause of the alert of the entity, and wherein the method can include determining, in accordance with the first resource contention, a first of the one or more remediations that includes adding one or more additional resources to a resource group of resources used by the entity.

In at least one embodiment, the one or more metrics can include a first set of one or more metrics including a first quality of service metric of the entity, and wherein the one or more machine learning models can include a machine learning model that performs processing that determines which alerts are caused by a quality of service problem of the entity. The processing performed by the machine learning model can include: determining, in accordance with the first set of one or more metrics, whether there is a first quality of service problem for the entity; responsive to determining that there is the first quality of service problem for the entity, determining that a current quality of service level for the entity is an expected cause for the alert of the entity; and responsive to determining that there is no quality of service problem for the entity, determining that the current quality of service level for the entity is not an expected cause for the alert of the entity. The first quality of service metric for the entity, which is the storage group, can denote an average delay that I/Os, which are directed to the one or more logical device of the storage group, wait for servicing. The current quality of service level for the entity can be determined to be an expected cause of the alert of the entity. The method can include determining, in accordance with the current service level of the entity, a revised service level of the entity, wherein the revised service level indicates a higher level of service for the entity than the current service level of the entity.

In at least one embodiment, the one or more metrics can include a first set of one or more metrics regarding a current workload of a corresponding one of: the entity associated with the alert or another entity of the system. The one or more learning models can include a machine learning model that performs processing that determines which alerts are caused by overloaded entities in the system. The processing performed by the machine learning model can include: determining, in accordance with the first set of one or more metrics, whether the current workload indicates that the corresponding one of the entity or another entity of the system is overloaded; responsive to determining that the current workload indicates that the corresponding one of the entity or another entity of the system is overloaded, determining that the current workload of the corresponding one of the entity or another entity of the system which is overloaded is an expected cause for the alert of the entity; and responsive to determining that the current workload does not indicate the corresponding one of the entity or another entity of the system is overloaded, determining that the current workload of the corresponding one of the entity or another entity of the system is not an expected cause for the alert of the entity.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 5-16 are examples of information which can be included in a report and which illustrate processing performed by the CARE in at least one embodiment in accordance with the techniques of the present disclosure.

DETAILED DESCRIPTION OF EMBODIMENT(S)

Figure 1:
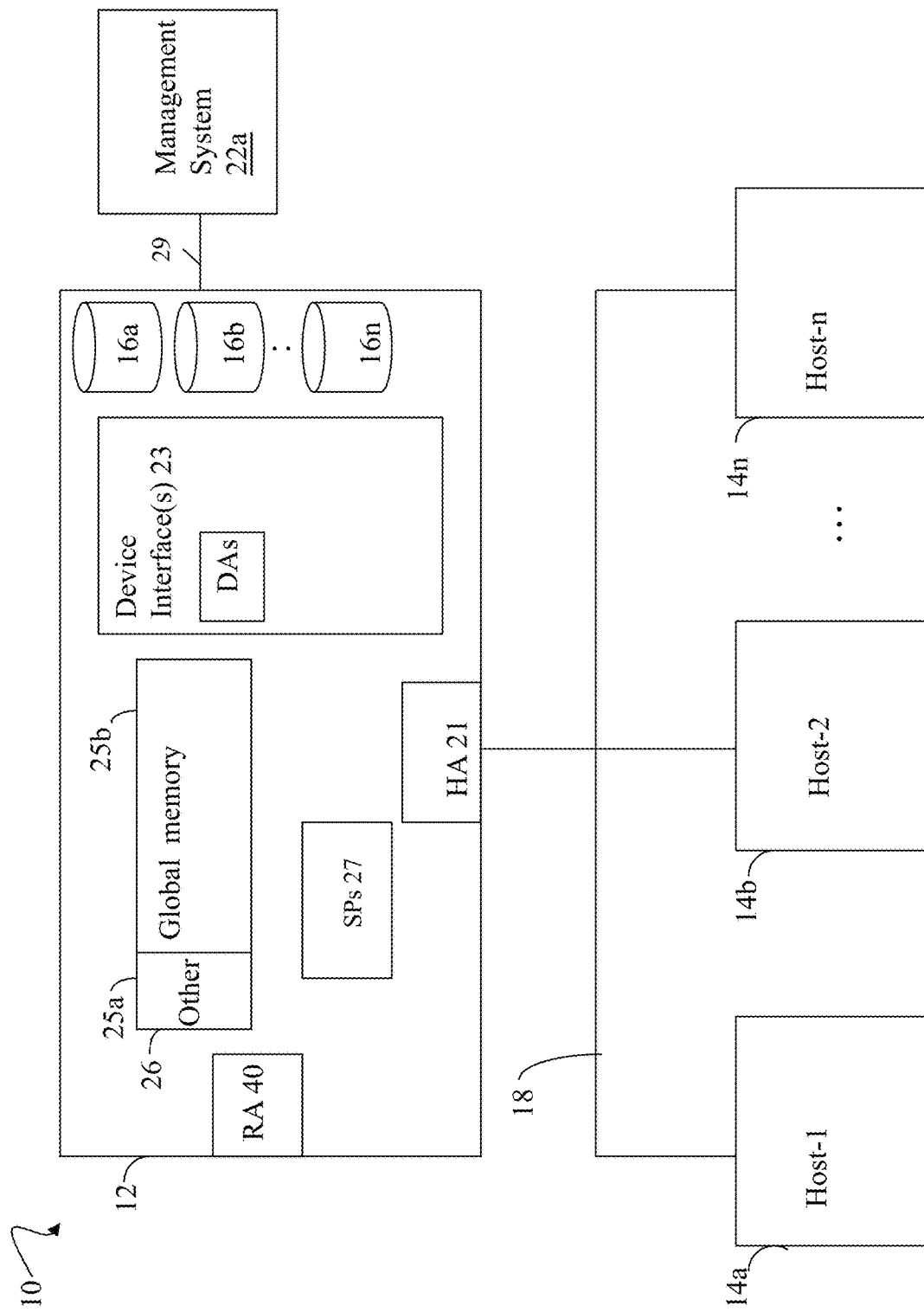
FIG. 1 is an example of components included in a storage area network (SAN) in accordance with the techniques of the present disclosure.

A data storage system can generate an alert to indicate a detected problem within the data storage system. Generally, the alert can be raised to signify a detected problem in any one of a variety of different areas with respect to a physical entity or logical entity in the data storage system. For example, a performance alert can be generated in response to detecting a performance violation for a storage group (SG) of one or more logical devices. To further illustrate, a measured response time for the SG exceeding a specified target response time threshold or goal of the SG is a performance violation that can trigger the performance alert.

When an alert such as the above-noted performance alert is raised in the data storage system, the data storage system typically notifies a data storage administrator or manager such as through an alert notification on a graphical user interface or GUI of a data storage management application. In response, the data storage administrator or manager typically performs an investigation to try and determine the cause or condition which triggered the alert. In many existing systems, the data storage administrator performs a manual investigation, for example, by viewing various metrics regarding different components of the data storage system in efforts to determine a root cause or primary contributing factor(s) resulting in the performance alert. Such an investigation can be complex, time consuming and error prone. As the size and complexity of the data storage system and its environment, such as the storage area network (SAN) including the data storage system, increase, so does the complexity and amount of time of the investigation. Further, performing the investigation often requires detailed knowledge regarding the particular data storage system and its current configuration. Additionally, assuming an expected cause of the alert is determined, the data storage administrator or manager typically tries to determine one or more possible remediation actions that can be taken to remove or at least reduce the adverse condition(s) suspected of causing caused the alert. Again, the particular remediation action(s) determined and taken can vary with the knowledge of the data storage system administrator and other aspects of the data storage system configuration.

Accordingly, described in the present disclosure are techniques that can be used to automatically detect and analyze complex workload and performance metrics, configuration information, and QOS (e.g., service level or compliance) information to determine one or more primary contributing factors or causes that triggered generating the alert. Additionally, the techniques of the present disclosure can further automatically determine and recommend one or more remediation actions to be taken to correct or alleviate the diagnosed adverse condition that caused the alert. The particular remediation action recommended can be based on the results of the analysis performed. In at least one embodiment, the analysis includes determining a cause of the alert by classifying the alert into one or more classifications each indicating a potential cause of the alert. In at least one embodiment, a rule-based machine learning engine or classifier can be used to perform the analysis and classification of the alert. The engine or classifier can generate an output that includes first information identifying the one or more classifications each indicating a potential or expected cause of the alert. The first information generated by the engine or classifier that identifies the one or more classifications can be further provided as an input to a remediation service. The remediation service can automatically select one or more remediation actions in accordance with the first information identifying the one or more classifications each denoting a potential or expected cause of the alert.

Although the techniques of the present disclosure are described in connection with a data storage system and with respect to particular alerts such as performance alerts, more generally, the techniques herein can be used in any suitable system with any suitable type of alert.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The PDs 16a-16n are generally non-volatile physical storage devices providing back-end physical storage in the data storage system 12. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using non-volatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDs 16a-n). The DAs can also be characterized as back end components of the data storage system which interface with, and access data stored on, the physical data storage devices (e.g., PDs 16a-n).

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher-end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The data path or I/O path can be contrasted to a control path or management path of the system. Generally, the control or management path denotes a logical flow hardware and software components or layers in connection with issuing and servicing management requests. Such management requests can be issued, for example, from a data storage management application or other supported management interface (e.g., GUI, command line interface (CLI), and/or API (application programming interface). Such management requests can include, for example, viewing information (e.g., metrics and status) about existing physical and/or logical entities (e.g., LUNs, SGs, RAID groups, storage pools, and/or physical components such as PDs and directors) in the current data storage system configuration, creating a new physical and/or logical entity in the configuration, deleting an existing physical and/or logical entity in the configuration, modifying an existing physical and/or logical entity in the configuration, and the like.

As noted above, a data storage system can generate an alert to indicate a detected problem within the data storage system. Generally, the alert can be raised to signify a detected problem in any one of a variety of different areas such as with respect to a physical entity or logical entity in the data storage system. For example, a performance alert can be generated in response to detecting a performance violation for an SG of one or more logical devices. To further illustrate, a measured response time for the SG exceeding a specified target response time threshold or goal of the SG can be a performance violation that triggers the performance alert.

Described in the present disclosure are techniques that can be used to automatically detect and analyze complex performance information, QOS or compliance information, and/or configuration information to determine a major contributing factor or cause that triggered generating the alert such as the above-noted performance alert for the SG indicating that the SG has a high response time above a specified threshold or target. Additionally, the techniques of the present disclosure can further automatically determine and recommend one or more remediation actions to be taken to correct or alleviate the diagnosed adverse condition that caused the alert. The particular remediation action(s) can be based on the results of the analysis performed. In at least one embodiment, a cause analysis and remediation engine (CARE) can perform the foregoing processing to determine one or more causes expected to have triggered the alert, and to determine one or more suitable remediation actions based on the one or more expected causes. In at least one embodiment, the CARE can include a rules engine and a remediation service. The rules engine can determine one or more causes expected to have triggered the alert, and, based on the one or more causes determined by the rules engine, the remediation service can determine one or more suitable remediation actions.

In at least one embodiment, the analysis includes running anomaly detection with respect to the metric of the particular entity that triggered the alert. Generally, anomaly detection identifies deviations outside of normal behavior by analyzing historical data. The anomaly detection can be viewed in one aspect as a filtering performed to determine whether the alert is an anomaly or deviation outside of previously observed historical data for the particular entity and metric. In some embodiments, the anomaly detection can be an optional processing step performed. In embodiments in which anomaly detection is performed for a generated alert, the anomaly detection can determine whether the generated alert is associated with conditions that denote an anomaly or deviation from normal expected behavior such as, for example, based on historical data. If the generated alert is determined to denote an anomaly, further analysis of the generated alert can be performed and additionally the system can notify a user, such as a data storage administrator, regarding the alert. Otherwise if the generated alert is determined not to denote an anomaly, further analysis of the alert can be omitted and the system also does not have to notify a user, such as a data storage administrator, regarding the alert. In at least one embodiment, the CARE can also perform anomaly detection with respect to other metrics of the particular entity that generated alert and/or of related objects or other entities as discussed below.

In at least one embodiment, anomaly detection can be performed as a filter of a generated alert prior to having the CARE perform processing for the alert. If the alert is determined to be an anomaly, then CARE can perform processing for the alert. Otherwise if the alert is determined not to be an anomaly, the conditions associated with the alert can be determined as normal behavior, where the alert can be further characterized as a false alarm or alert condition associated with normal expected behavior for the particular entity. For example, based in historical data for the particular entity, the generated alert can be associated with a temporary short lived condition that routinely occurs for the particular entity at particular points in time. In this case, anomaly detection can determine the generated alert is a false alarm since properties or attributes of the alert correspond to normal, expected or routine behavior based on historical data for the particular entity. For example, historical data can indicate that an SG's RT typically spikes between 12 and p.m. on every Sunday. Even though the SG's RT during this time period from 12-5 pm on Sunday can sometimes intermittently and temporarily exceed a specified threshold RT generating an alert, anomaly detection can recognize that such an occurrence is part of the expected behavior for the SG from 12-5 p.m. on Sunday. If however the same behavior generating the alert occurs at a different point in time other than from 12-5 pm on Sunday, anomaly detection can determine that the alert corresponds to an anomaly since the historical data for the SG indicates that the measured RT at the different point in time is outside of the bounds of RT values associated with normal expected RT behavior for the SG.

In at least one embodiment, the further analysis performed for alerts, such as those determined to be anomalies, can include the CARE performing noisy neighbor analysis to identify any related objects or entities impacting each other's performance. With respect to an alert, the alert can be generated with respect to a particular entity, such as the SG noted above. A noisy neighbor with respect to the SG for which the alert is generated can be another SG that monopolizes resource(s) of the data storage system and thus adversely impacts the performance of the SG. Such resources can include, for example, CPU resources, memory, cache, a DA or port thereof, and/or an FA or port thereof. With respect to related objects or entities in connection with noisy neighbor analysis in at least one embodiment, two entities can be deemed related to one another if they share one or more resources that can impact each other's performance. For example, a first SG, SG1, and a second SG, SG2, can be related if they are configured to share a same DA where data from LUNs of SG1 and SG2 are both stored on PDs serviced by the same DA. As another example, SG1 and SG2, can be related if they are configured to share a same FA or FA port where I/Os directed to LUNs of SG1 and SG2 are both received at and serviced by the same FA or FA port. Thus in at least one embodiment, noisy neighbor analysis can be performed with respect to a current configuration of the data storage system identifying which objects or entities use what physical components, or more generally one or more resources, of the system. The current configuration can identify, for example, which DAs service PDs storing data for particular SGs, which FAs receive I/Os for particular SGs (e.g., based on what SGs of LUNs are exposed over which FAs or target ports of the data storage system), and the like. Noisy neighbor analysis can generally include analyzing appropriate workload and/or performance metrics (e.g., IOPS (I/Os per second), data throughput or bandwidth such as megabytes per second, and/or response times) for logical components (e.g. SGs, and/or port groups of logically defined groups of physical ports) and/or physical components (e.g. directors, ports, hosts) to see if related objects, such as two LUNs or two SGs, are impacting each other's performance.

In at least one embodiment, the CARE can perform anomaly detection as part of the further analysis in conjunction with noisy neighbor analysis. For example, assume that a RT performance alert is generated for SG1, that noisy neighbor analysis determines that SG1 and SG2 share resources such as the same the same target port group (TPG denoting a logical group of one or more target ports of one or more FAs), and that noisy neighbor analysis determines that SG2 also has a very high I/O workload W2 which denotes that SG2 is a noisy neighbor of SG1 where SG2's high workload W2 is adversely impacting SG1's performance. Anomaly detection can be used as a filter on W2 (the workload for SG2) by CARE to determine whether the current workload W2 for SG2 denotes a changed increase in SG2's workload. Assume that SG2 has a historical workload W2 of always being very high and exceeding a specified threshold. In this case, the high workload of SG2 is not expected to be the cause of SG1's performance alert because SG2's workload W2 is always high. In other words, SG1 previously had a lower RT which did not generate a performance alert even when SG2 had the same currently high workload W2. Thus anomaly detection can be used to filter the workload W2 of SG2 and determine whether the currently high workload W2 is normal and expected or is otherwise an anomaly for SG2. For example, if the high workload W2 is an anomaly, then SG2's high workload can be determined as a noisy neighbor causing SG1's performance alert. Otherwise, if the high workload W2 is not an anomaly, then SG2's high workload is not determined as a noisy neighbor causing SG1's performance alert. More generally, the anomaly detection can be performed as part of the further analysis of CARE in conjunction with any other analysis or metric to filter out or distinguish between normal or expected behavior and anomalous behavior, for example, such as of related objects. In at least one embodiment, the anomaly detection can be performed as a filter on SG2's workload W2 prior to performing noisy neighbor analysis. If anomaly detection processing determines that SG2's workload W2 (at the same point in time as the performance alert) is a "high" anomaly associated with a high workload exceeding SG2's expected maximum workload, then noisy neighbor analysis can be performed. Otherwise, if W2 at the same point in time of the performance alert is determined not to be a "high" anomaly, noisy neighbor analysis can be omitted. In this manner, noisy neighbor analysis can be conditionally performed if the related SG2's workload W2 is a "high" anomaly.

In at least one embodiment, the further analysis performed for alerts, such as those determined to be anomalies, can include CARE performing resource contention analysis to identify unbalanced and/or overloaded physical components with excessive workloads that can potentially cause performance issues. For example, two SGs can be configured to use the same TPG of the data storage system where one of the two SGs has the performance alert being analyzed. Resource contention analysis can determine that the TPG is overloaded having an existing workload or utilization exceeding a specified threshold. In such an embodiment, resource contention can be determined to be a cause of the alert due to the shared TPG (shared or used by SG1 and SG2) being overloaded. A remediation action can include, for example, modifying the existing configuration of the system so that SGs do not share the same TPG. For example, one of the SGs having the higher workload can be reconfigured to use a different TPG that is currently unused or used by another third SG, SG3, having a very low I/O workload. As another possible remediation action, one or more FA ports having a low utilization can also be added to the TPG to increase the amount of available FA port resources.

In at least one embodiment, the further analysis performed for alerts, such as those determined to be anomalies, can include CARE performing a QOS (quality of service) analysis such as to determine whether there is a QOS problem or issue for a logical entity, such as an SG. In such an embodiment, a QOS level can be specified for an SG where the QOS level identifies one or more performance targets or goals for the SG. The performance targets or goals can be specified with respect to any one or more metrics such as response time, data bandwidth, I/O throughput, and the like. For example, the QOS level for an SG can include a response time (RT) target or goal denoting an expected threshold level of I/O RT performance. The RT target or goal can be specified in any suitable manner such as using one or more thresholds or ranges. For example, the RT goal for the SG can be a range from a specified minimum RT to a maximum RT where the target RT for the SG is any value falling between the minimum RT and maximum RT. The QOS analysis can determine, for example, whether the average wait time per I/O for the SG exceeds a specified threshold and if so determine that QOS is a cause for the alert. The average wait time per I/O for the SG can denote, for example, the amount of time I/Os of the SG wait in a queue such as of the FA before being serviced or processed. In such an embodiment where the average wait time per I/O is determined to exceed a specified threshold, QOS is determined as a cause of the alert. A remediation action in this case can include, for example, increasing the QOS level of the SG. For example, an embodiment can define multiple QOS or service levels such as diamond with an average I/O RT goal of 0.6 milliseconds; platinum with an average I/O RT goal of 0.8 milliseconds; gold with an average RT goal of 1 millisecond; and silver with an average RT goal of 2.0 milliseconds; and bronze with an average RT goal of 7 milliseconds. The foregoing RT goals can have associated tolerances or windows denoting a range of acceptable RTs (e.g., 0.6 milliseconds+/−0.2 milliseconds for diamond and similarly for other QOS levels). The SG receiving the alert can have a QOS level of silver whereby one of the remediations can be to increase the QOS or service level for the SG from silver to a higher QOS or service level such as diamond, platinum or gold.

Generally, the QOS analysis can identify limits (e.g., limits with respect to IOPS, data bandwidth or throughput) and delays (e.g. additional delays or latency introduced into I/O response times) that are introduced due to quality of service impacts (e.g. Service Level Compliance). Generally the data storage system can apply or enforce specified QOS limits and delays for any suitable entity or object. For example, the QOS limits and delays can be implemented with respect to a logical entity such as a single SG or a single host. If the entity is a single host, the data storage system can have further knowledge regarding the particular SGs used by a particular host and the particular initiators of the host that issue I/O operations to the particular SGs. Such further knowledge or information can be acquired in any suitable manner such as, for example, through prior discovery processing and/or through information provided by a control or management path of the system. For example in the QOS analysis, a QOS level for an SG can have maximum allowable limits such as in terms of IOPS or a data bandwidth or throughput rate (e.g., megabytes per second). Thus different QOS levels can have different associated maximum allowable limits where, for example, the highest ranked QOS level such as diamond has the highest maximum allowable limits of all QOS levels, and the lowest ranked QOS level such as bronze has the lowest maximum allowable limits of all QOS levels. Such maximum allowable limits can be imposed or enforced to limit the amount of system resources consumed by an SG with an associated QOS level. If the data storage system determines that the SG has an observed amount of IOPS or data bandwidth that exceeds one of maximum allowable limits for the particular QOS level of the SG, then the system can use different techniques to keep the SG within its associated maximum allowable limits. For example, assume that the SG is exceeding its maximum allowable IOPS or data bandwidth limit. In at least one embodiment, the system can introduce an artificial extra time delay (sometimes referred to herein as a QOS delay per I/O or delay per I/O) into the I/O RT for I/Os directed to LUNs of the SG by, for example, waiting an extra amount of time before returning an acknowledgement to the host that issued the I/O to a LUN of the SG once the system has serviced the I/O, and/or changing the priority of at least some queued I/Os of the SG waiting for servicing so that other queued I/Os directed to other SGs are serviced prior to queued I/Os of the SG. The queued I/Os of other SGs can be prioritized over queued I/Os of the SG for other reasons such as, for example, since the other SGs have a higher QOS level or priority than the current QOS level or priority of the SG. The QOS analysis can determine the average QOS delay per I/O introduced by the system for each I/O directed to a LUN of the SG. If the foregoing delay exceeds a threshold and/or has recently increased relative to historical data for the SG, the QOS analysis can determine that QOS is a cause of the alert and a remediation service can recommend a suitable remediation action such as increasing the QOS or service level of the SG.

In at least one embodiment, the average QOS delay per I/O or delay per I/O can more generally denote the average amount of time an I/O waits in a queue, such as a queue of an FA port that received the I/O, before being serviced. In at least one embodiment, anomaly detection can be used to determine whether the foregoing average QOS delay per I/O denotes an anomaly and has recently increased relative to historical data for the SG. If the QOS analysis combined with the anomaly detection determine that the SG's current average QOS delay per I/O is an anomaly and also exceeds a specified maximum threshold, then the QOS analysis can determine that QOS is an expected cause of the alert and a remediation service can recommend a suitable remediation action such as increasing the QOS level of the SG.

As another example, the QOS analysis can compare the currently observed or measured IOPS and/or data bandwidth of the SG to the maximum allowable limits of the SG (based on the SG's QOS level). If the QOS analysis determines that either the currently measured IOPS or data bandwidth of the SG is near their respective allowable limit (e.g., within a specified tolerance) then a remediation service can recommend a suitable remediation action such as to increase the QOS level of the SG to thereby increase the allowable maximum limits for the SG.

In at least one embodiment, the further analysis performed for alerts, such as those determined to be anomalies, can include CARE performing a workload analysis (e.g., such as with respect to I/O workloads of SGs and/or component level utilization such as of DAs, FAs, TPGs, per FA port, per DA port) to identify recently changed workloads that can affect physical and/or logical components. For example, a detected anomaly can be that a physical and/or logical entity's workload or utilization has significantly increased (e.g., based on a specified threshold level) in comparison to the normal or expected workload pattern for the entity. Such an increase in the workload of a first entity can denote a cause for an alert, for example, of the first entity or of another entity such as a related entity sharing resources with the first entity. In such an embodiment, the anomaly detection can identify the recently changed workloads as those which are detected anomalies with respect to one or more metrics. As an alternative in at least one embodiment, the recently changed workloads can be identified using another suitable technique independent of a particular technique used for anomaly detection.

In at least one embodiment, the workload analysis can determine that a current workload of a physical component, such as an FA or an FA port, exceeds a specified threshold resulting in the current workload being classified as an expected cause of a performance alert generated for an SG. In this case, the remediation service can determine a remediation action that, for example, modifies the current configuration of the system in any suitable manner to reduce the workload of the particular physical component. For example, an existing TPG, which is used by the SG and which includes the FA or FA port, can be modified to include an additional FA or FA port with low utilization. As another option, the remediation action can include removing one or more SGs from the set of SGs that are serviced by the affected overloaded FA or FA port.

In at least one embodiment, the rules engine of CARE can be a rule-based machine learning (ML) engine or classifier that performs the further analysis and classification of the alert. The cause of the alert can be identified by classifying the alert into one or more classifications each indicating a potential cause of the alert. The ML engine or classifier can generate an output that includes first information identifying the one or more classifications each indicating a potential cause of the alert. The first information generated by the ML engine or classifier that identifies the one or more classifications can be further provided as an input to the remediation service. The remediation service can automatically select one or more remediation actions in accordance with the first information identifying the one or more classifications each denoting a potential cause of the alert. In at least one embodiment, the one or more remediations can be provided as recommendations to a user who can then choose to implement or perform such one or more remediations. In such an embodiment, the CARE can generate a report that includes the one or more remediations with instructions on how to implement or perform the remediations. In at least one embodiment, the one or more remediations can be performed automatically in response to a user input or in response to a configuration option indicating to automatically proceed with the one or more remediations.

In at least one embodiment, the ML engine, classifier or rules engine can include one or more trained models, where each such model can perform analysis for one classification denoting one potential or expected cause of the alert. Thus, the ML engine or classifier can determine one or more potential or expected causes of the alert. A trained model can determine, for example, whether a cause for an alert is due to a particular cause such as one of a resource contention, a noisy neighbor, a QOS breach, and the like. In at least one embodiment, each of the trained models can be trained using supervised learning to recognize one expected cause of an alert when provided with input including one or more metrics, configuration data and/or compliance or QOS information. With supervised learning, labeled datasets are used to train a model to classify input data accurately. In at least one embodiment, each of the trained models can be a decision tree that recognizes when the input provided is classified as belong to a particular classification, where the classification denotes a particular cause of an alert. Thus, each decision tree classifies or labels input as belonging to a particular classification denoting a cause of the alert, or otherwise not belonging to the particular classification denoting a cause of the alert. Generally, the input includes information describing current conditions occurring in the data storage system at the time of the alert. Consistent with other discussion herein, the input can include configuration information, QOS or compliance information, and/or one or more metrics characterizing the behavior of one or more entities in the system at the time the alert is generated for an entity of the system. Based on the classification of the input by applying one or more rules of one or more of the trained models, one or more expected causes of the alert can be determined.

A decision tree is a tree structure that includes nodes and edges or branches between nodes. Non-leaf nodes can test for certain conditions such as for particular values of a certain attribute such as a metric. A non-leaf node is a parent node that has children or child nodes at a lower level in the tree where the parent node is connected to its child nodes by edges or branches. Leaf nodes are terminal nodes that represent classes or classifications. A parent node which tests for a particular condition results in an outcome used to select one of the parent node's child nodes. Thus in one aspect a decision tree can be characterized as a flowchart-like structure in which each internal node represents test or decision on a feature (e.g., such as a metric value), each leaf node represents a class label (e.g., a decision, final outcome or classification), and branches represent conjunctions of features that lead to those class labels denoted by the leaf node. Each of the paths of a decision tree from a root to a leaf node represents a classification rule.

Newly trained models can be added to the ML engine or classifier for new, additional causes of alerts. Additionally, an existing trained model that determines whether an alert is generated by a particular classification or cause can be retrained, for example, to recognize additional conditions denoting the particular classification or cause of an alert. For example, an existing decision tree can recognize whether a performance alert is caused by a resource contention due to an overloaded director, such as an overloaded FA having a current workload or utilization exceeding a specified threshold. Subsequently, an additional condition or set of conditions can be determined to denote a second resource contention condition, such as where an FA is shared by a maximum number of SGs and each such SG has an average observed I/O workload (e.g., measured in IOPS, bandwidth or data throughput (e.g., megabytes/second) that exceeds a specified threshold. As another example, an additional condition denoting a resource contention for which the existing model can be retrained can be where a FA or DA has a current workload or utilization above a specified threshold and the current workload or utilization is determined not to be an anomaly by anomaly detection processing. The existing model or decision tree can be retrained using additional data sets to recognize this additional set of one or more conditions whereby the existing decision tree is modified and expanded to recognize this additional set of conditions. The retraining of the existing decision tree can result, for example, in a revised decision tree that includes one or more additional rules in the form of additional paths which are added to the existing decision tree. An embodiment can generally use any suitable method to train and retrain models, such as decision trees, of the ML engine or classifier.

In at least one embodiment, anomaly detection can be performed with respect to a time series model representing historical data such as, for example, with respect to a particular metric for a particular physical or logical entity in the system. In at least one embodiment, the time series data corresponding to observed values of the metric over time can be decomposed such as based on STL or Seasonal and Trend decomposition using Loess. STL is a statistical method of decomposing the time series data into 3 components including seasonality, trend and residual. The seasonal component denotes a cyclic pattern usually occurring, for example, on a daily cycle for minute or hour data or a weekly cycle for daily data. The trend component denotes longer term behavior or patterns over many observations. For example, a particular metric can reach a particular value at about midnight every Sunday. The season and trend components taken together can form the regular part of the series, and the remainder can be used in connection with anomaly detection. STL uses LOESS (locally estimated scatterplot smoothing) to extract smooths estimates of the three components. Thus the season and trend components denote the normal or expected behavior and the remainder component can be used in detecting anomalies. Thus anomaly detection is performed on remainders from a time series analysis that have had both the seasonal and trend components removed. The remainder can then be analyzed to identify data points that are statistical outliers denoting anomalous behavior. More generally, any suitable technique can be used to perform anomaly detection such as to detect statistical outliers denoting detected anomalies.

As noted above, the ML engine or classifier, sometimes more generally referred to as the rules engine, in at least one embodiment can include multiple trained ML models that recognize and classify alerts using rules. The ML engine can include one trained model for each different classification. A trained model can be trained to recognize and classify an input as either belonging to one classification or not belonging to the one classification, where the classification denotes an expected cause for an alert. In at least one embodiment for an alert generated for an entity, each such model can be a supervised trained ML model that classifies an input (e.g., which includes information and conditions in the system associated with the alert and/or entity) as either belonging to the classification (e.g., expected cause of the alert) recognized by the model or otherwise not belonging to the classification recognized by the model. In at least one embodiment each of the trained models can be a decision tree as also noted above. In at least one embodiment, the rules engine includes multiple trained models where some or all of the multiple models can run in parallel when analyzing an input including information describing conditions in the system at the time of a generated alert, where the analysis is performed to determine one or more expected causes of the alert.

Generally, the models can be trained using configuration information, compliance information and/or workload and performance metrics associated with expected cause(s). The configuration information can include data storage system configuration information. For example, the configuration information can indicate which FAs and target ports thereof are included in each TPG, which one or more LUNs are included in each defined SG, which FAs or target ports thereof are configured to expose and service particular SGs of LUNs (e.g., which FAs and FA target ports service which LUNs/which SGs of LUNs), and the like. Thus in at least one embodiment, the ML engine or classifier can use the configuration information to identify, for example, what SGs or LUNs share resources such as FAs or target ports thereof. In at least one embodiment, a first trained model that recognizes a noisy neighbor and/or a second trained model that recognizes resource contention can be used to determine related objects that share particular resources. For example, the first trained model that recognizes a noisy neighbor can use the configuration information to determine related SGs, where two SGs are deemed related if the configuration information indicates the two SGs share at least one FA port or, more generally, share at least one FA. For a first SG having a current performance alert where the first SG shares an FA or FA port with a second SG, the first trained model can further determine whether the workload of the second SG exceeds a specified threshold denoting that the second SG is overloaded, and if so, can determine that the noisy neighbor, the second SG, is an expected cause of the first SG's performance alert. The foregoing first and second trained models can each receive input which includes the configuration information in combination with one or more metrics of one or more entities in the system at the time of the alert. The first trained model can determine whether the input indicates that a noisy neighbor, such as one SG related to another SG for which an alert is generated, is an expected cause of the alert. The second trained model can determine whether the input indicates that a resource contention is a cause of the alert. The second trained model can determine, for example, whether the input to the second model denotes an overloaded FA or FA port shared by two related SGs where one of the related SG has a currently generated performance alert, and if so, that the input denotes a resource contention that is an expected cause of the performance alert.

The compliance information can include QOS information. The compliance information can identify what are the QOS limits or targets for the different QOS levels and also identify the particular QOS level currently assigned to each SG. For example, as noted above, an embodiment can predefine multiple service levels or QOS levels such as diamond, platinum, gold, silver and bronze. For each QOS level, the QOS information in at least one embodiment can identify the performance targets or goals as well as any limits For example, for each QOS level, the QOS information can identify a target RT goal or target (e.g., such as a range), and can identify target or maximum allowable resource limits for the particular QOS level. Such resource limits can include, for example, a maximum allowable data bandwidth or throughput (e.g., megabytes/second), a maximum allowable I/O rate or IOPS, and the like. The maximum allowable limits can be specified and apply at any suitable component level. For example, the resource limits can specify an aggregate limit for an SG across all FAs. The resource limits can specify individual per FA or per target port limits for an SG. In at least one embodiment, resource limits can be included in and specified as part of the different QOS levels. In at least one embodiment, the resource limits can be modified or specified independently of an associated performance QOS level such as denoting a RT goal or target. A trained model of the ML engine that recognizes QOS issues or problems can use the QOS information to determine whether an expected cause for a generated alert for an entity is due to a performance threshold and/or a specified resource limit specified for the entity.

In at least one embodiment, the workload and performance metrics can include one or more of the following: a measured or observed I/O RT, a percentage or other metric denoting utilization of a component or resource, a measured or observed I/O throughput or rate (e.g., IOPS), a measured or observed data throughput (e.g., megabytes/second), an average QOS delay per I/O, and the like. Workload and performance metrics can be specified for different logical and/or physical entities in the system. For example, in at least one embodiment, one or more of the following can be specified for each SG: an average measured or observed RT for I/Os directed to the SG; an average QOS delay per I/O; a measured or observed I/O throughput or rate for the SG; a measured or observed data throughput for the SG; a measured or observed I/O throughput or rate for the SG directed to a particular FA, target port, or TPG; a measured or observed data throughput rate (e.g., megabytes/second) for the SG directed to a particular FA, target port, or TPG, and/or average I/O size. For example, in at least one embodiment, one or more of the following can be specified for each FA port, each FA, each DA, each DA port: a percentage denoting component utilization, and an observed or measured data throughput rate such as an average such rate. A trained model of the ML engine that recognizes QOS issues or problems can use the workload and performance metrics, alone or in combination with the QOS information, to determine whether an expected cause for a generated alert for an entity is due to a performance threshold and/or a specified resource limit specified for the entity. For example, consider a performance alert generated for an SG having a high RT above a maximum allowable RT threshold or target for the SG. The trained model can determine whether an average QOS delay per I/O for the SG is above a specified delay threshold, where the specified delay threshold can be included in QOS information associated with the SG. If the trained model determines the average QOS delay per I/O of the SG is above the specified threshold, the trained model can determine that a QOS issue or breach due to a high average QOS delay per I/O for the SG has occurred is also an expected cause for the alert. Additionally, the remediation service can use the QOS information in connection with determining recommended remediation actions for the detected QOS issue. For example, the remediation service can map the QOS issue cause or classification to a remediation action to recommend increasing the specified service level of the SG from its current service level classification of silver to a higher service level such as diamond, platinum or gold.

With supervised learning, each of the trained models of the rules engine in at least one embodiment can be a decision tree. A decision tree can be trained using supervised learning using a training data set that includes multiple records. Each record can be generally represented as (x1,x2,x3, ..., xk, Y) and characterized as a vector including features x1, x2, ..., xk and also including the target variable Y denoting the resulting classification for which the model is being trained. For example, assume a model is being trained to classify an expected cause of a performance alert as either due to a resource contention or not due to a resource contention. The training data set can include records each with values for one or more metrics describing the workload of a resource, configuration information about what entities of the system share what resources, and then an indicator of whether or not the other information of the record denotes that a resource contention is an expected cause. For example, assume a performance alert is generated for an SG that shares an FA port with one or more other SGs. A record of a training data set can include workload and/or performance metrics for the FA port. The metrics can include, for example, a percentage (e.g., from 0-100%) denoting resource utilization of the FA port, and values for one or more workload metrics for the FA port such as IOPS (e.g., I/O rate), data bandwidth and/or throughput rate (e.g., megabytes/second). The record can include configuration information identifying which SGs share the FA port. The record can include QOS information or service level information. The record can include a label or indicator denoting how to classify the metrics and configuration information of the record. In this case, the label or indicator of a record denotes whether or not the particular metric values and configuration information of the same record are classified as a resource contention (e.g., indicating whether or not the record denotes conditions where resource contention is an expected cause of the alert).

The particular rules included in the trained model, such as a decision tree, can vary depending on the particular metrics used, the records of the training data set, and the particular thresholds of the rules determined during the training needed to properly classify and partition the training data set.

Generally, the one or more trained models of the rules engine are trained to recognize one or more expected causes of alerts. In at least one embodiment, each model is trained to classify an input as either denoting a particular one of the expected causes of an alert, or otherwise not denoting the particular one of the expected causes of the alert. The input can generally be associated with the alert and includes information describing aspects of the system, and entities thereof, at the time of the alert. The input can include one or more: configuration information, compliance or QOS information, and one or metrics for one or more entities in the system.

The one or more metrics can characterize any of workload, performance and QOS for an entity in the system. Each model can use rules to classify inputs as either denoting the particular expected cause of the alert, or otherwise not denoting the particular expected cause of the alert.

Each of the trained models can be trained such using suitable training data sets for supervised learning. For a particular model trained to recognize inputs denoting a particular expected cause of an alert, the model can be trained until the model has a suitable or acceptable level of success in correctly classifying inputs as belonging or not belonging to the particular classification for which the model is trained.

The foregoing and other aspects of the techniques of the present disclosure are described in more detail in the following paragraphs.

Figure 2:
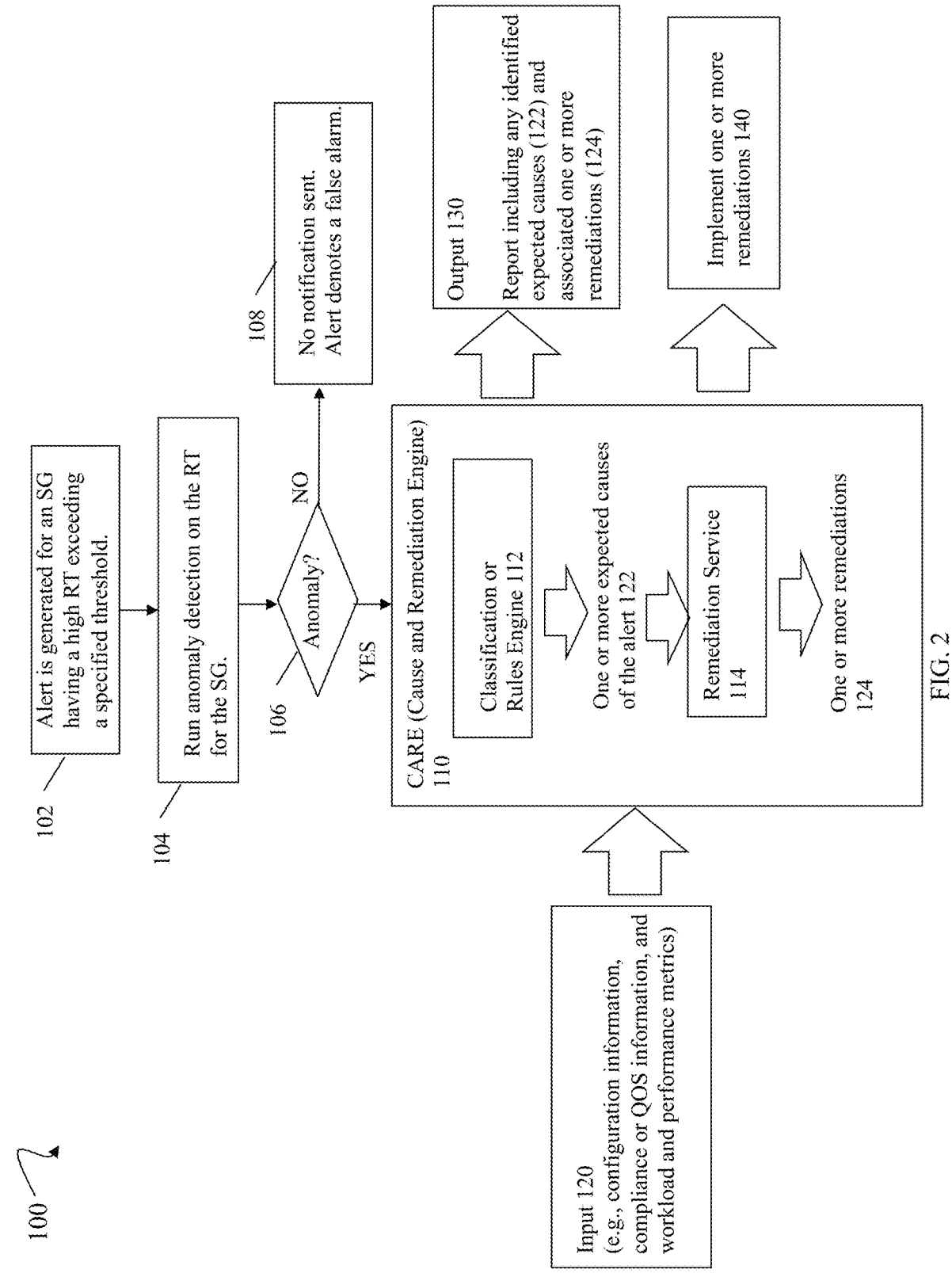
FIG. 2 is an example illustrating components and processing flow in at least one embodiment in accordance with the present disclosure.

Referring to FIG. 2, shown is a diagram 100 illustrating components and associated data flow in at least one embodiment in accordance with the techniques of the present disclosure.

The techniques of the present disclosure are illustrated in the following paragraphs and figures in connection with an alert generated for an SG having a measured RT exceeding its maximum allowable RT target. More generally, the techniques herein can be used in connection with any suitable metric and with respect to any suitable entity in the system. Additionally, although the processing of the diagram 100 is triggered due to the generation of an alert in the step 102 as discussed below, more generally, any suitable defined trigger condition can trigger or initiate performing the processing discussed below using the techniques of the present disclosure. Additionally, although the processing of the diagram 100 is triggered due to the generation of an alert in the step 102 as discussed below, more generally, any suitable defined trigger condition can trigger or initiate performing the processing discussed below using the techniques of the present disclosure. For example, multiple trigger conditions can be defined where the techniques of the present disclosure, such as beginning with the step 104 discussed below, can be performed responsive to the occurrence of any one of the defined trigger conditions.

In connection with the diagram 100, an example using the techniques herein is illustrated where an alert is generated in the step 102 for an SG having a measured high RT exceeding a specified threshold. In this particular example, assume the SG for which the alert is generated in the step 102 has a QOS level of silver with a target or maximum allowable RT threshold of 2.0 ms., and where the SG has a measured RT of 3.0 ms. The alert in the step 102 is triggered by the measured RT of 3.0 ms. exceeding the target maximum allowable RT of 2.0 ms. In at least one embodiment, the measured RT of 3.0 ms and the SG's RT goal or maximum allowable target of 2.0 ms. can denote average RT values determined in any suitable manner. From the step 102, control proceeds to the step 104.

At the step 104, anomaly detection is performed on the RT metric for the SG. Anomaly detection as can be performed in the step 104 discussed in more detail in prior paragraphs and also subsequent paragraphs. Consistent with such discussion, anomaly detection as performed in the step 104 identifies deviations in the SG's RT that are outside of normal behavior based on prior historical data of the SG's RT. In the step 104, the anomaly detection can be viewed as a filtering performed to determine whether the alert generated in the step 102 is an anomaly or deviation outside of previously observed historical data for the SG's RT. In the step 104, the anomaly detection analyzes historical data previously collected for the SG's observed or measured RT and determines whether the generated alert from the step 102 is associated with conditions that denote an anomaly or deviation from the normal expected behavior with respect to the SG's RT based on the historical data. From the step 104, control proceeds to the step 106.

At the step 106, a determination is made as to whether the conditions of the generated alert, the SG's current measured RT of 3.0 ms., denote an anomaly, based on anomaly detection processing performed in the step 104. If the step 106 evaluates to false or no in the case where the generated alert from the step 102 is determined not to denote an anomaly, control proceeds to the step 108. In connection with the step 108, further analysis of the alert is omitted and the system also does not have to notify a user, such as a data storage administrator, regarding the alert. In connection with the step 108, the generated alert 102 can be viewed in one aspect as a false alarm.

If the step 106 evaluates to yes or true, the generated alert from the step 102 is determined to be an anomaly and the CARE 110 performs further analysis of the generated alert regarding the SG's measured RT of 3.0 ms.

Consistent with discussion above, the CARE 110 generally performs cause analysis for the generated alert and then, based on one or more causes determined by the cause analysis, determines one or more remediations which can be performed to alleviate or remove the undesirable conditions that triggered the alert. Further details regarding components of the CARE 110 are discussed both above and below in subsequent paragraphs and figures (e.g., FIGS. 3 and 4).

In at least one embodiment, the CARE 110 receives input 120, performs analysis based on the input 120 to determine one or more expected causes of the alert generated in the step 102, determines one or more remediations based on the one or more expected causes, and generates output 130. The input 120 can generally include configuration information, compliance or QOS information, and/or workload and performance metrics discussed in more detail elsewhere herein. Generally, the input 120 can include compliance or QOS information regarding the SG for which the alert is generated in the step 102, one or more workload and performance metrics regarding the SG for which the alert is generated in the step 102, and configuration information regarding the SG for which the alert is generated in the step 102. The output 130 can include a report identifying any expected causes of the generated alert from the step 102. Additionally, the CARE 110 in some embodiments can also implement (140) one or more of the remediations determined for one or more of the expected causes determined by the CARE 110.

The CARE 110 can include a classification engine or rules engine 112 that determines, in accordance with the input 120, one or more expected causes of the alert 122. The one or more expected causes of the alert 122 can then be provided as an input to the remediation service 114. The remediation service 114 determines one or more remediations 124 in accordance with the one or more expected causes 122.

Figure 3:
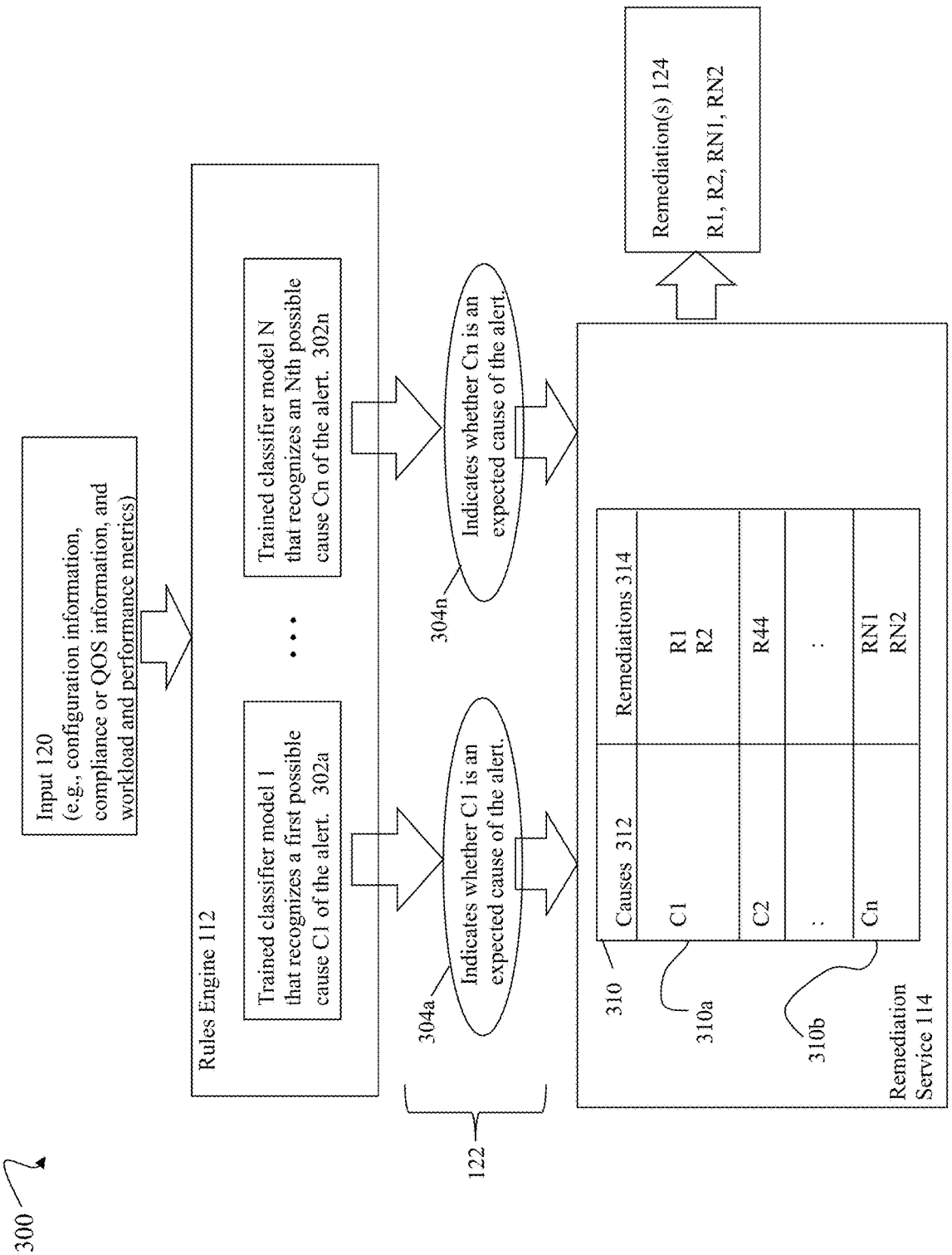
FIGS. 3 and 4 are examples providing further detail regarding components of the cause analysis and remediation engine (CARE) in at least one embodiment in accordance with the present disclosure.

Referring to FIG. 3, shown is an example 300 illustrating further detail regarding the rules engine 112, the one or more expected causes 122 of the alert (as determined by the rules engine 112), and the remediation service 114 in at least one embodiment in accordance with the techniques of the present disclosure.

As noted above, the ML engine or classifier, sometimes more generally referred to as the classification or rules engine 112, in at least one embodiment can include multiple trained ML models 302a-n, where each such model recognizes and classifies input provided to the model using one or more rules. The rules engine 112 can include one trained model for each different classification. A trained model can be trained to recognize and classify an input as either belonging to one classification or not belonging to the one classification, where the classification denotes an expected cause for an alert. In at least one embodiment for an alert generated for an entity, each such model can be a supervised trained ML model that classifies an input (e.g., which includes information and conditions in the system associated with the alert and/or entity) as either belonging to the classification (e.g., expected cause of the alert) recognized by the model or otherwise not belonging to the classification (e.g., not an expected cause of the alert) recognized by the model. In at least one embodiment each of the trained models can be a decision tree as also noted above and discussed in more detail below (e.g., FIG. 4). In at least one embodiment, the rules engine 112 includes multiple trained models 302a-n where some or all of the multiple models can run in parallel when analyzing an input including information describing conditions in the system at the time of a generated alert, where the analysis is performed to determine one or more expected causes of the alert. Generally, each of the models 302a-n can be trained using one or more features of the input 120 provided to the CARE 110.

In the example 300, the rules engine 112 includes "n" trained models such as, for example, the trained classifier model 1 302a which recognizes a first possible cause C1 of generated alerts, and the trained classifier model n 302n which recognizes an Nth possible cause Cn of generated alerts. The trained models 302a-n generate output 122 identifying whether the expected causes C1-Cn recognized respectively by the models 302a-n are expected causes of the current alert, such as generated in the step 102. For example, the model 302a can generate the output 304a indicating whether C1 is an expected cause of the alert generated in the step 102, . . . and the model 302n can generate the output 304n indicating whether Cn is an expected cause of the alert generated in the step 102.

In at least one embodiment, the element 122 can be a vector or array of indicators identifying expected causes of the alert generated in the step 102. For example, in at least one embodiment, each of the models 302a-n can generate either an indicator denoting a particular expected cause recognized by the model, or otherwise generate a 0 or null condition. To further illustrate, the model 302a generates an indicator identifying C1 as an expected cause if, based on one or more inputs provided to the model 302a, the model 302a classifies the one or more inputs (denoting existing conditions associated with the current alert from the step 102) as denoting the expected cause C1.

The one or more expected causes 122 can be provided as an input to the remediation service 114. In at least one embodiment, the remediation service 114 uses the table 310 to map the expected cause/causes 122 to the one or more remediations 124 provided as an output. For example, assume that the element 122 indicates that C1 and Cn are expected causes of the generated alert. In this case, the remediation service 114 uses the table 310 to map expected causes C1 and Cn (312) to one or more corresponding remediations (314).

The table 310 includes a first column 312 of expected causes and a second column of remediations 314. The table 310 can include a row for each expected cause that can be determined by one of the trained models 302a-n. For example, assume the element 122 indicates that C1 and Cn are expected causes of the generated alert as determined by the trained models 302a and 302n. In this case, the remediation service 314 uses the table 310 as a lookup based on the expected cause C1 (column 312) and locates the entry 310a which indicates that R1 and R2 are recommended remediations for the expected cause C1. The remediation service 314 uses the table 310 as a lookup based on the expected cause Cn (column 312) and locates the entry 310b which indicates that RN1 and RN2 are recommended remediations for the expected cause Cn. The remediation service 114 can then include R1, R2, RN1 and RN2 in the output 124 of possible recommended remediations to be performed as corrective actions taken to alleviate or remove the undesirable conditions that caused the generated alert in the step 102.

Figure 4:
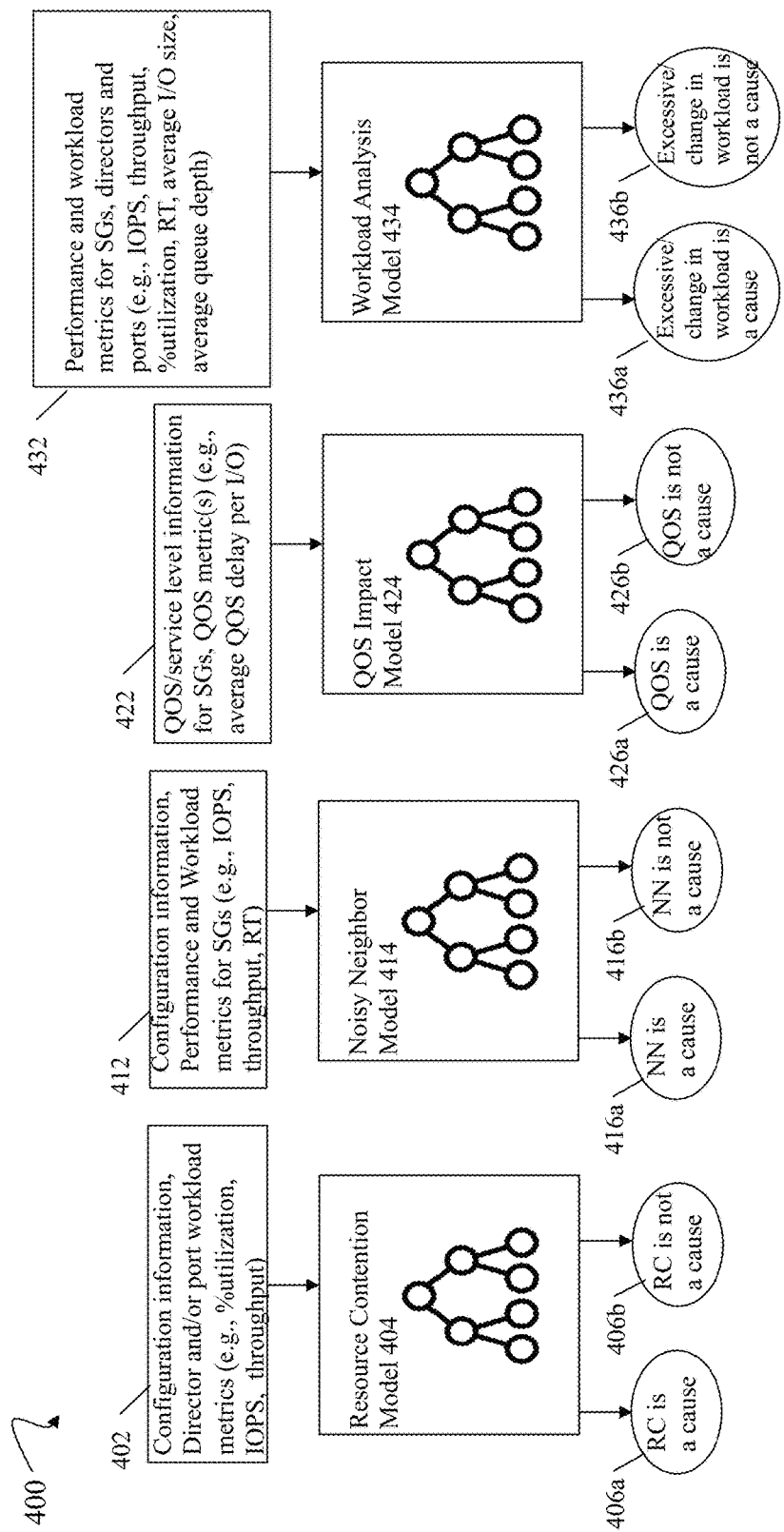

Referring to FIG. 4, shown is an example 400 providing further detail regarding trained models 302a-n in at least one embodiment in accordance with the techniques of the present disclosure.

The example 400 includes 4 trained models each of which is a decision tree described in more detail below. The example 400 includes only 4 models for purposes of illustration and, more generally, the rules engine 112 can include one or more such trained models.

The resource contention model 404 takes inputs 402 and classifies the inputs 402 as either denoting that resource contention (RC) is an expected cause 406a of the generated alert, or otherwise denoting that RC is not an expected cause 406b of the generated alert. In this example, the inputs 402 can include configuration information and one or more workload metrics of a director and/or director port. To further illustrate, consider the alert generated in the step 102 for the SG having the 3 ms. measured RT. The resource contention model 404 can be provided with inputs 402 regarding the workload (e.g., IOPS, % utilization, data bandwidth or throughput (e.g., MB s/second)) of one or more FAs and/or FA ports used by the SG. Additionally, the inputs 402 can include configuration information identifying which one or more other SGs also share the FAs and/or FA ports used by the SG. The resource contention model 404 can include one or more rules that classify the input as either denoting RC as an expected cause (406a) or not (406b). For example, the model 404 can include a first rule that determines whether an FA or FA port used by the SG is also shared by at least one other SG, and whether one or more workload metrics for the shared FA/FA port is above a specified maximum value. If the first rule evaluates to true where the model 404 determines that there is an FA or FA port shared by the SG with at least one other SG, and where the shared FA/FA port has at least one workload metric (e.g., any one or more of IOPS, % utilization, and throughput) exceeding an associated maximum value, then the model 404 outputs 406a indicating that RC is an expected cause of the RT alert generated for the SG in the step 102. Otherwise, if there is no rule of the model 404 that evaluates to true, then the model 404 outputs 406b indicating that RC is not an expected cause of the RT alert generated for the SG in the step 102.

The noisy neighbor model 414 takes inputs 412 and classifies the inputs 412 as either denoting that a noisy neighbor (NN) is an expected cause 416a of the generated alert, or otherwise denoting that a NN is not an expected cause 416b of the generated alert. In this example, the inputs 412 can include configuration information and one or more workload and performance metrics regarding SGs in the system. To further illustrate, consider the alert generated in the step 102 for the SG having the 3 ms. measured RT. The NN model 414 can be provided with inputs 412 regarding the performance and workload of SGs (e.g., IOPS, data bandwidth or throughput (e.g., MBs/second), RT) of SGs in the system. Additionally, the inputs 412 can include configuration information identifying which one or more other SGs also share at least one director or director port with the SG for which the alert is generated in the step 102.

Assume that the configuration information identifies which one or more SG also share at least one FA or FA port with the SG for which the alert is generated in the step 102. Such one or more SGs sharing at least one FA or FA port with the SG can be characterized as related to the SG having the alert from the step 102. The NN model 414 can include one or more rules that classify the input 412 as either denoting a NN as an expected cause (416a) or not (416b). For example, the model 414 can include a first rule that determines whether another SG is related to the SG having the alert (e.g., whether another SG shares at least one FA or FA port with the SG having the alert), and whether the related SG has one or more workload or performance metrics (e.g., IOPS, throughput, RT) above one or more specified thresholds thereby denoting that the related SG is overloaded and/or otherwise has a current RT above a specified allowable maximum. If the first rule evaluates to true where the model 414 determines that there is another related SG with at least one performance or workload metric (e.g., any one or more of IOPS, RT, and throughput) exceeding an associated maximum value, then the model 414 outputs 416a indicating that a NN is an expected cause of the RT alert generated for the SG in the step 102. Otherwise, if there is no rule of the model 414 that evaluates to true, then the model 414 outputs 416b indicating that a NN is not an expected cause of the RT alert generated for the SG in the step 102.

The QOS impact model 424 takes inputs 422 and classifies the inputs 422 as either denoting that QOS is an expected cause 426a of the generated alert, or otherwise denoting that QOS is not an expected cause 426b of the generated alert. In this example, the inputs 422 can include QOS or service level information for the SGs of the system. To further illustrate, consider the alert generated in the step 102 for the SG having the 3 ms. measured RT. The model 424 can be provided with inputs 422 regarding the current QOS or service level of SGs such as whether each SG has a service level of diamond, platinum gold, silver or bronze, and where such service levels denote target performance levels for the SG such as maximum allowable RT values or goals for the SG. The inputs 422 can include one or more resource limits for SGs or other entities in the system. The resource limits can include, for example, a host I/O limit specifying a maximum allowable rate (e.g., IOPS) regarding front-end or host I/Os that can be received for a particular SG, and/or another workload limit such as a maximum data throughput rate allowed for the SG. The inputs 422 can include one or more QOS metrics such as, for example, the average QOS delay per I/O for each of the SGs indicating an average amount of time each I/O for the SG waits in the queue for servicing. The QOS or service level information included in the unput 422 to the model 424 can also specify, for example, a maximum threshold value for the average QOS delay per I/O metric. In at least one embodiment, the maximum threshold can vary with the particular QOS or service level associated with an SG. For example, a diamond level SG can have a lower maximum threshold for the average QOS delay per I/O metric than another SG assigned a lower QOS or service level.

The model 424 can include one or more rules that classify the input 422 as either denoting QOS as an expected cause (426a) or not (426b). For example, the model 424 can include a first rule that determines whether the measured average QOS delay per I/O for the SG having the alert in the step 102 exceeds a maximum allowable value, where the maximum allowable value can be vary in accordance with the particular QOS or service level of the SG.

If the first rule evaluates to true where the model 424 determines that measured average QOS delay per I/O of the SG having the alert exceeds the maximum allowable value for the SG, then the model 424 outputs 426a indicating that QOS of the SG is an expected cause of the RT alert generated for the SG in the step 102.

The model 424 can include a second rule that determines whether a measured value for a workload metric for the SG having the alert in the step 102 exceeds or otherwise approximates (e.g., within a specified tolerance) a maximum allowable value such denoted by an existing resource limit for the SG. For example, the second rule can determine whether the measured IOPS for the SG exceeds or approximates the resource limit for host or front-end I/Os per second (IOPS) for the SG. The second rule evaluating to true can indicate that current resource limit of front-end or host IOPS for the SG can be an expected cause for the SG's RT alert in the step 102. The foregoing resource limit for IOPS for the SG can be included in QOS or compliance information for the SG. If the second rule evaluates to true, then the model 424 outputs 426a indicating that QOS of the SG is an expected cause of the RT alert generated for the SG in the step 102. Additionally if the second rule evaluates to true, an associated remediation can be, for example, to raise the resource limit for the SG regarding IOPS and/or for another workload limit (e.g., data throughput rate) for the SG.

If there is no rule of the model 424 that evaluates to true, then the model 424 outputs 426b indicating that QOS of the SG is not an expected cause of the RT alert generated for the SG in the step 102.

The workload analysis model 434 takes inputs 432 and classifies the inputs 432 as either denoting that an excessive workload or changed workload of an entity (e.g., SG, director and/or port) of the system is an expected cause 436a of the generated alert in the step 102, or otherwise denoting that that an excessive workload or a changed working of an entity is not an expected cause 436b of the generated alert in the step 102. In this example, the inputs 432 can include performance and workload metrics for one or more entities in the system such as, for example, SGs, directors and/or ports in the system. The inputs 432 can include one or more performance and workload metrics such as one or more of: IOPS, % utilization, RT, average I/O size, and/or average queue depth. Average queue depth can be metric associated with an entity of the system, where the entity has an associated queue of requests waiting to be serviced. The average queue depth can denote the average size of the queue of requests waiting to be serviced. For example, the average queue depth can be a metric provided in connection with a director, such as an FA, and/or director port, such as an FA port, indicating an average amount of time I/O requests wait in an associated queue of the director or director port for servicing. To further illustrate, consider the alert generated in the step 102 for the SG having the 3 ms. measured RT. The model 434 can be provided with inputs 422 regarding the performance and workload of SGs, directors and/or ports in the system. The model 434 can include one or more rules that classify the input 432 as either denoting an overloaded entity as an expected cause (436a) or not (436b). For example, the model 434 can include a first rule that determines whether an FA or FA port has one or more workload metrics (e.g., one or more of IOPS, throughput, % utilization, average queue depth) exceeding a specified maximum threshold indicating that the FA or FA port is overloaded. The model 434 can include a second rule that determines whether the one or more workload metrics (e.g., one or more of IOPS, throughput) for an SG exceed a specified maximum threshold indicating that the SG is overloaded. The model 434 can include a third rule that determines whether the one or more performance metrics, such as RT, for an SG exceed a specified maximum threshold indicating that the SG is overloaded as denoted by poor or low RT performance. The model 434 can include a fourth rule that determines whether there has been any recent change in workload of an entity in the system, such as an FA or an SG where such a workload is considered an anomaly by anomaly detection processing and where the workload change is deemed an anomaly that is an increase in workload for the entity at the time of the SG alert of the step 102. If any of the foregoing 4 rules evaluates to true, then the model 434 outputs 436a indicating that excessive workload is an expected cause of the RT alert generated for the SG in the step 102. Otherwise, if there is no rule of the model 434 that evaluates to true, then the model 434 outputs 436b indicating that excessive workload not an expected cause of the RT alert generated for the SG in the step 102.

What will now be described are FIGS. 5-16 illustrating information that can be included in a generated report in at least one embodiment in accordance with the techniques of the present disclosure. Such figures more generally illustrate the result of processing that can be performed by the CARE in at least one embodiment in accordance with the present disclosure.

Figure 5:
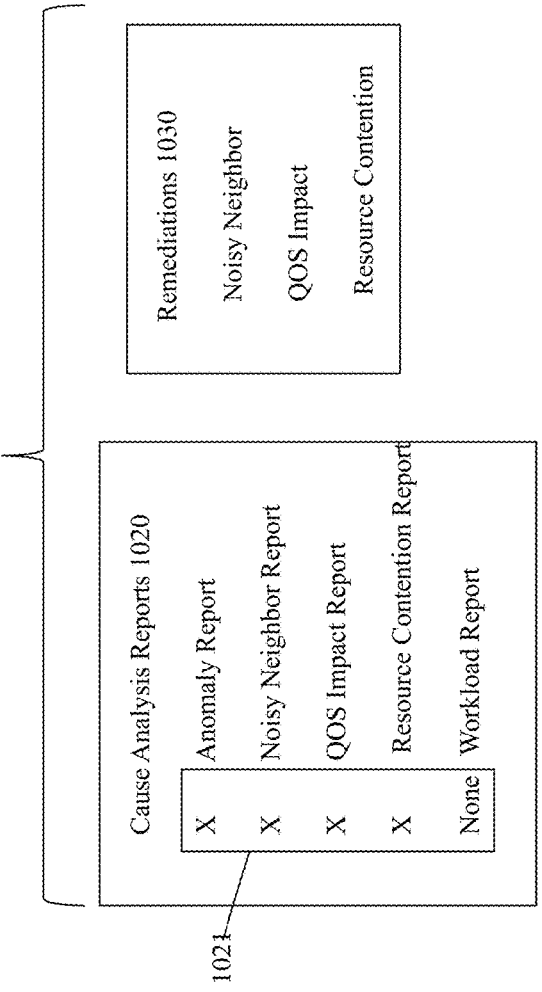
Figure 6:
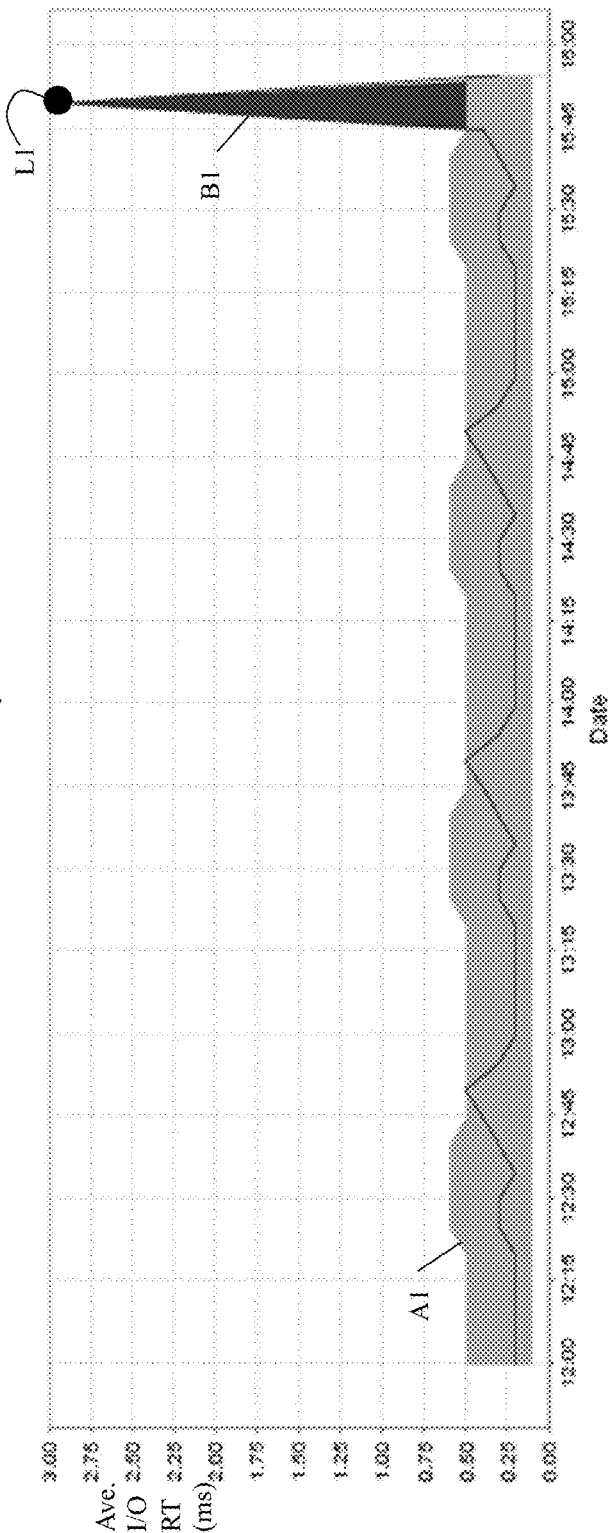

In the following paragraphs in connection with FIGS. 5-6, illustrated is an example of information that can be included in a report in at least one embodiment in accordance with the present disclosure for a generated alert. For purposes of illustration in this example, the alert is a performance alert for a storage group SG1 having a measured average RT of 3 milliseconds (ms.) which exceeds the specified maximum allowable RT target or goal of 2 ms. based on the silver service level of SG1.

Referring to FIG. 5, shown is an example 1000 of information that can be included in a report generated by the CARE in at least one embodiment in accordance with the present disclosure.

The example 1000 includes a summary report 1010 for SG1. The summary report 1010 identifies the particular cause analysis reports 1020 and the remediations 1030 generated for the performance alert for SG1. The cause analysis reports 1020 specifies what separate cause analysis reports are further included in the overall report. The cause analysis reports 1020 can include a separate report for each expected cause determined by one of the trained models of the ML engine or classifier (more generally the rules engine). In this example, the rules engine can include 4 separate trained models where a first trained model determines whether an expected cause for a generated alert is due to a noisy neighbor, a second trained model determines whether an expected cause for a generated alert is due to a QOS issue or problem, a third trained model determines whether an expected cause for a generated alert is due to a resource contention, and a fourth trained model determines whether an expected cause for a generated alert is due to a recent I/O workload change, such as a recent increase in I/O workload, for SG1. In this example, the cause analysis reports 1020 can also include a separate report, an anomaly report, for any detected anomalies such as with respect to the various workload and performance metrics of SG1. In at least one embodiment, anomaly detection can be performed using any suitable anomaly detection technique such as, for example, the STL technique described elsewhere herein.

The cause analysis reports 1020 includes a column 1021 with an "X" next to the particular areas for which a report is generated and otherwise indicates "None" if no report is included for a particular area. In the example 1000 as denoted by the elements 1020 and 1021, the following reports are included: an anomaly report, a noisy neighbor report, a QOS impact report, and a resource contention report. However as also indicated by the elements 1020 and 1021, the generated report does not include a workload report. In this example, the summary information of 1020 indicates that a report is generated for each particular expected cause determined by one of the above-noted 4 trained models. Otherwise, if a particular cause is not determined as an expected cause of the performance alert of SG1, then no report is generated for the particular cause. Additionally, in this example an anomaly report is included based on anomaly detection performed for the various workload and performance metrics of SG1.

The remediations 1030 indicates that the report also includes information on recommended remediations that can be performed in response to the following expected causes determined by the rules engine: a noisy neighbor, a QOS impact or issue, and a resource contention.

Figure 7:
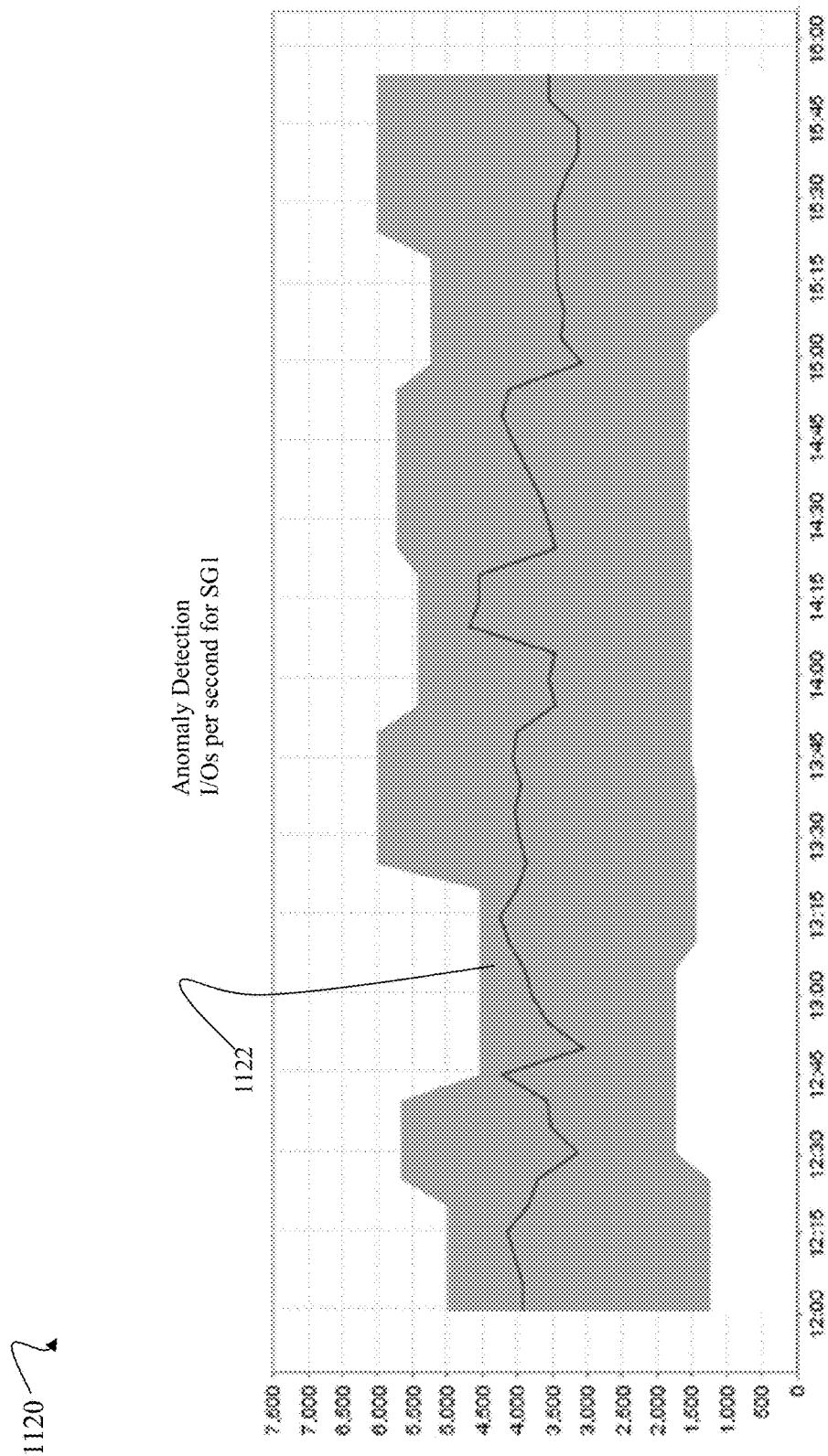
Figure 8:
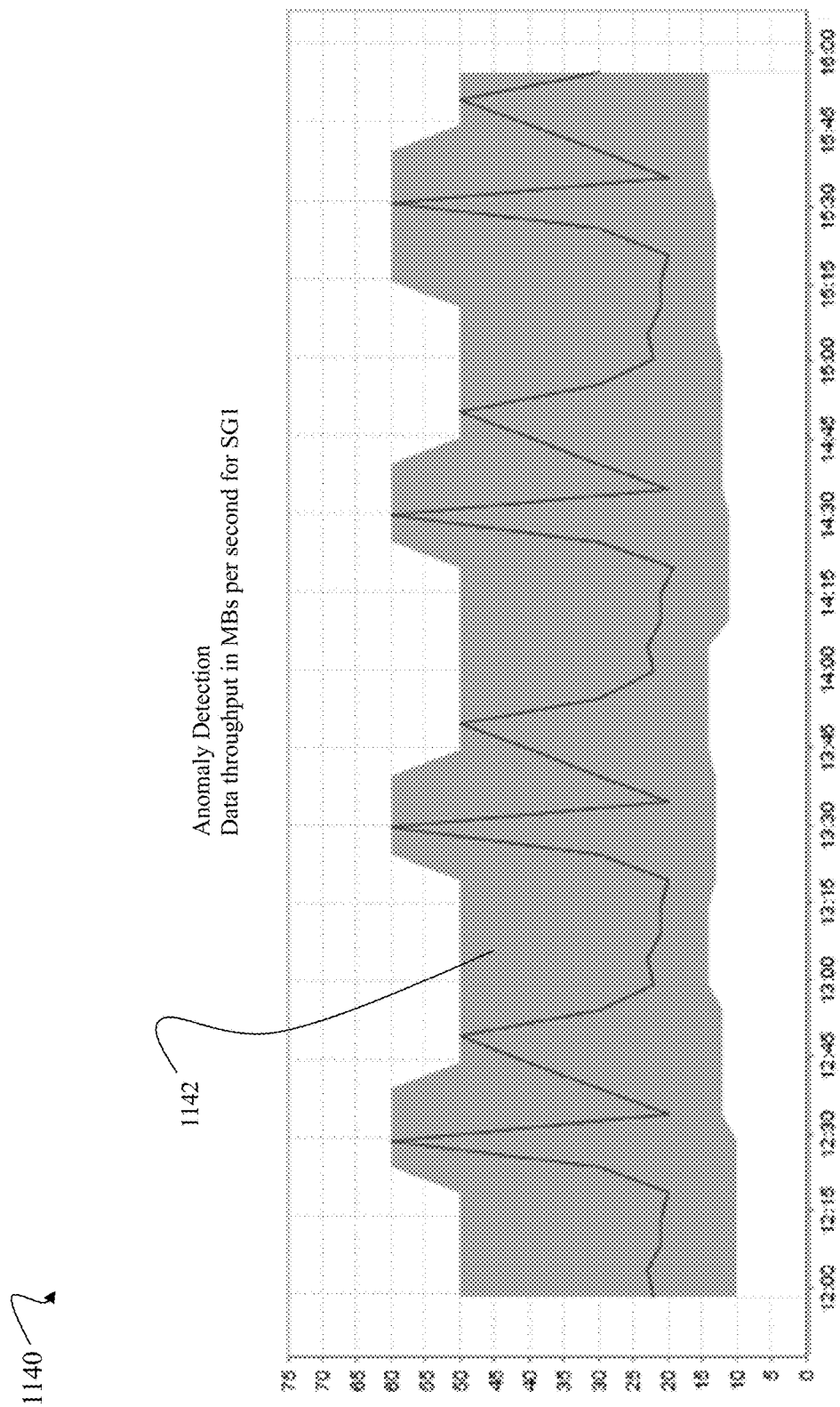

With reference to the FIGS. 6-8, examples are provided of information that can be included in the anomaly report generated for the performance alert for SG1. Additionally, such FIGS. 6-8 illustrate processing that can be performed in connection with anomaly detection in at least one embodiment in accordance with the techniques of the present disclosure.

Referring to FIG. 6, shown is an example 1100 illustrating graphically an anomaly detected in SG1's RT. The graph 1100 denotes the average I/O RT in ms. on the Y axis versus time on the X axis. The shaded area A1 denotes the historic seasonality of regular, normal expected RTs for SG1. The shaded area B1 denotes a detected spike of a detected anomaly in SG1's recent I/O RT such as within the last hour or 45 minutes. The shaded area B1 spans an amount of time on the X axis during which the detected anomaly of the SG1's RT exists.

As denoted by B1, the detected RT anomaly for SG1 is an increase in RT for SG1 whereby anomaly detection processing has determined that the increase in SG1's RT denoted by B1 is irregular or not part of SG1's expected normal RT behavior (where the expected normal behavior has bounds at various points in time as denoted by A1). The point L1 denotes the point in time at which the performance alert for SG1 is generated. The shaded area A1 denotes the bounds of expected normal behavior for the IOPS metric of SG1 as determined by anomaly detection processing.

Referring to FIG. 7, shown is an example 1120 illustrating graphically the results of anomaly detection performed on an I/O workload metric of SG1. The graph 1120 denotes the average host or front-end I/O rate in I/Os per second (IOPS) on the Y axis versus time on the X axis. The time period or window denoted on the X axis corresponds to the same time period denoted in FIG. 6. In the example 1120, anomaly detection processing has determined that there is no change or no anomaly with respect to the expected behavior of IOPS for SG1 for any point in time denoted on the X axis. Thus, although there has been a spike in SG1's RT as illustrated by B1 in the example 1100, there has been no corresponding increase in workload with respect to the IOPS workload metric for SG1. The shaded area 1122 denotes the bounds of expected normal behavior for the IOPS metric of SG1 as determined by anomaly detection processing.

Referring to FIG. 8, shown is an example 1140 illustrating graphically the results of anomaly detection performed on another I/O workload metric of SG1. The graph 1140 denotes the front-end data throughput rate (e.g., data throughput rate through FAs) in MBs per second on the Y axis versus time on the X axis. The time period or window denoted on the X axis corresponds to the same time period denoted in the FIGS. 6 and 7. In the example 1140, anomaly detection processing has determined that there is no change or no anomaly with respect to the expected behavior of the data throughput rate over time for SG1. Thus, although there has been a spike in SG1's RT as illustrated in the example 1100, there has been no increase in workload with respect to the data throughput workload metric for SG1. The shaded area 1142 denotes the bounds of expected normal behavior for the data throughput metric of SG1 as determined by anomaly detection processing.

Figure 9:
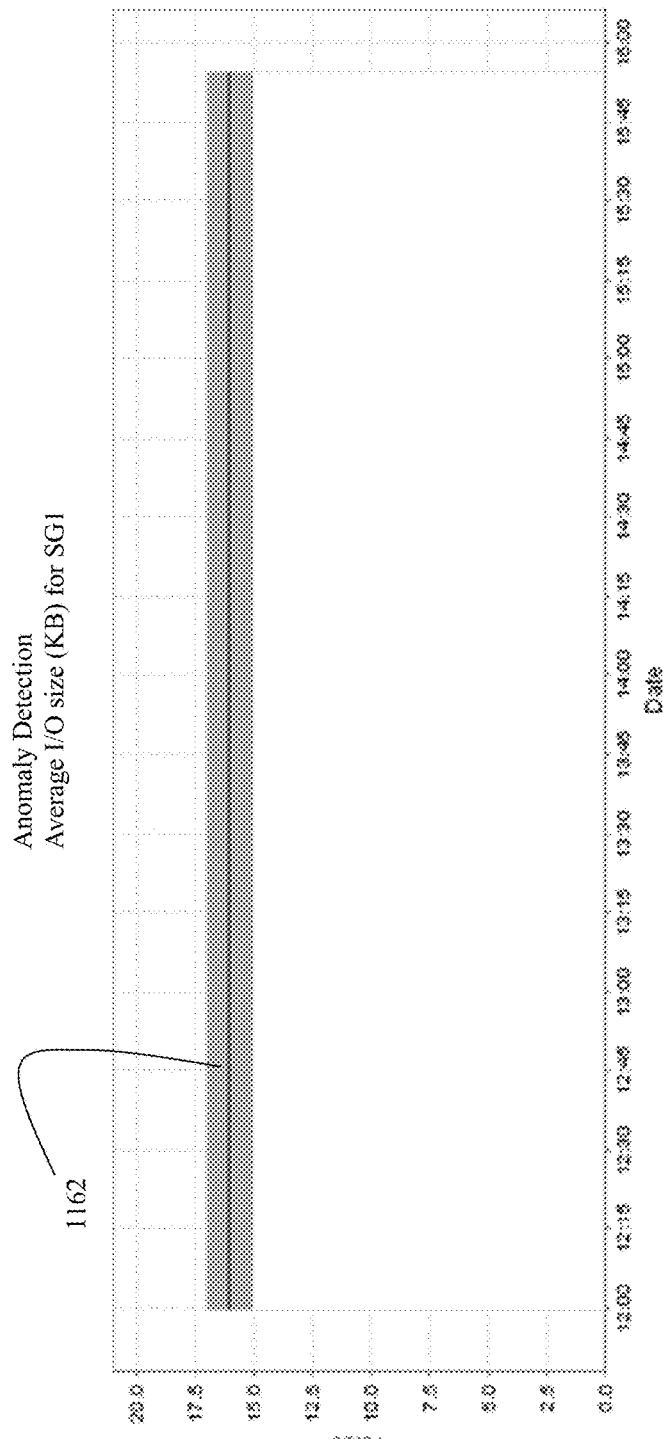

Referring to FIG. 9, shown is an example 1160 illustrating graphically the results of anomaly detection performed on another I/O workload metric of SG1. The graph 1160 denotes the average I/O size in kilobytes (KB) on the Y axis versus time on the X axis. The time period or window denoted on the X axis corresponds to the same time period denoted in the FIGS. 6, 7 and 8. In the example 1160, anomaly detection processing has determined that there is no change or no anomaly with respect to the expected behavior of the average I/O size over time for SG1. Thus, although there has been a spike in SG1's RT as illustrated in the example 1100, there has been no increase or change with respect to the average I/O size metric for SG1. The shaded area 1162 denotes the bounds of expected normal behavior for the IOPS metric of SG1 as determined by anomaly detection processing. The shaded area 1162 denotes the bounds of expected normal behavior for the average I/O size metric of SG1 as determined by anomaly detection processing.

Although there has been no recent significant increase or change (e.g., no detected anomaly) with respect to the expected I/O workload of SG1 as denoted by no detected anomalies for the various I/O workload metrics in the FIGS. 7-9, there has been a significant increase or change with respect to the expected I/O RT of SG1 as denoted by the detected I/O RT anomaly B1 of FIG. 6. Based on the foregoing, the workload analysis can be performed by one of the trained models of the rules engine which determines that the current I/O workload of SG1 is not an expected cause for SG1's performance alert, whereby no workload report is generated for SG1 (as denoted in the summary 1020). The particular trained model can be trained to recognize when an increased workload is an expected cause of an alert and, in this example, classifies SG1's workload as not a cause for the performance alert. For example, the particular trained model can perform the foregoing classification of SG1's workload based on observed or measured values for one or more of the foregoing I/O workload metrics: average I/O size, IOPS, and data throughput rate. In this example, the particular trained model can also perform the foregoing classification based on whether an anomaly has been detected denoting an increase for any of the foregoing workload metrics and whether the current value of such a metric for which an anomaly is detected exceeds a specified threshold. Such thresholds can be included, for example, in QOS information of SG1. The particular thresholds can also vary depending on the particular metrics of the training data. In at least one embodiment, the particular thresholds can be determined during the training of the model where the thresholds are based on learned thresholds needed to properly classify and partition the training data to identify when a particular entity's workload, as characterized by one or more workload metrics provided to the model, denotes an overloaded entity.

Referring to FIG. 10, shown is an example 1200 illustrating response time and workload metrics for other storage groups or SGs determined as related SGs with respect to SG1 in at least one embodiment in accordance with the techniques of the present disclosure.

The element 1210 denotes the time frame or period over which the various workload and performance metrics of the table 1212 are calculated. The element 1210 indicates a time frame that corresponds to the same time period denoted in the FIGS. 6-9.

The table 1212 includes a row of current metric values determined for the time frame 1210 for each SG that is related to SG1. The table 1212 identifies related SGs in the column 1212a and includes the following metrics in subsequent columns: RT (in ms.) in the column 1212b, IOPS (corresponding to front-end or host IOPS) in the column 1212c, and data throughput in terms of MBs/second (corresponding to a front-end data throughput rate through the FAs) in the column 1212d.

In this example 1200, two SGs are determined as related if they share at least one FA port, and thus share at least one FA. To further illustrate as denoted by the entry 1202 of the table 1212, SG1 and SG2 are related in that I/Os directed to LUNs of both such SGs are serviced by at least one same FA port. An embodiment can also include one or more other criteria used in determining shared resources between SGs. Such criteria can be used to determine whether two SGs are related to one another for purposes of noisy neighbor classification. Such criteria can be based, for example, on the particular conditions and metrics used by a trained model to classify or recognize a noisy neighbor as an expected cause of an alert.

Based on the information in the table 1212, a trained model that is trained to classify a particular SG's workload as a noisy neighbor can determine that the rows 1202 and 1204 denote that the SG2 and SG3 are noisy neighbors and expected causes of the performance alert for SG1. In at least one embodiment, the trained model can include one or more rules that classify a workload as either a noisy neighbor or not a noisy neighbor based on one or more workload metrics. For example, the trained model can include a first rule that classifies an observed or measured IOPS value for an SG as in the column 1212c as denoting the SG is a noisy neighbor if the measured IOPS value (column 1212c) for the SG is above a specified threshold. The trained model can include a second rule that classifies an observed or measured data throughput rate for an SG as in the column 1212d as denoting the SG is a noisy neighbor if the measured data throughput rate (column 1212d) for the SG is above a specified threshold. The trained model can include a third rule that classifies an SG as a noisy neighbor if the measured IOPS value (column 1212c) for the SG is above a specified threshold and also if the observed or measured data throughput rate for the SG as in the column 1212d is above a specified threshold. The particular rules included in the trained model, such as a decision tree, can vary depending on the particular metrics of the training data. The particular thresholds of the foregoing rules can be determined during the training of the model based on the particular thresholds needed to properly classify and partition the training data.

In at least one embodiment, anomaly detection can be further performed on the workloads of the top ranked noisy neighbors, such as SG2 and SG3 noted above. If the anomaly detection determines that the current workload for SG2 (such as based on one or more of the workload metrics 1212c and 1212d) is an anomaly with respect to the normal behavior or pattern of SG2's workload, then SG2 can be determined as a noisy neighbor and an expected cause of SG1's performance alert. Otherwise, if the anomaly detection determines that the current workload for SG2 is not an anomaly with respect to the normal behavior or pattern of SG2's workload, then SG2 is not determined as a noisy neighbor and is not an expected cause of SG1's performance alert. The foregoing is based on the rational that if a related SG's workload has always been high based on historical data such that the high workload is not currently an anomaly, then the SG's high workload is likely not a cause for the current increased change in SG1's RT (as illustrated by B1 in FIG. 6).

In connection with the example 1200, assume that noisy neighbor processing, such as performed by one of the trained models, classifies SG2 and SG3 as noisy neighbors of SG1 and thus the high workloads of SG2 and/or SG3 (as indicated by the I/O metric values in the columns 1212c-d of the rows 1202 and 1204) are expected causes of the performance alert for SG1. In this case, the trained model that classifies a related SG having a high workload as a noisy neighbor can determine, using one or more rules of the model, that both SG2 and SG3 are related to SG1 and also both SG2 and SG3 have I/O workloads exceeding one or more specified thresholds.

Referring to FIG. 11, shown is an example of information that can be included in a report regarding related or shared FA directors and FA ports in at least one embodiment in accordance with the techniques of the present disclosure. The related or shared FA directors and FA ports are those FA directors and FA ports shared by SG1 and one or more other SGs.

The element 1222 denotes the time frame or period over which the various metrics of the tables 1224 and 1227 are calculated. The element 1222 indicates a time frame that corresponds to the same time period as used for the information in the FIGS. 6-10.

The table 1224 includes an entry for each related FA or front-end director. The table 1224 includes a first column 1224a denoting the FA director names, a second column 1224b denoting % Utilizations, and a third column 1224c denoting queue depths. Each queue depth of 1224c indicates an average length of the queue of received I/Os or requests which are waiting to be processed by a particular FA associated with the queue. For example, the entry 1225 indicates that the FA-1D has a % utilization of 22.2 and has an average queue depth of 6.4; and the entry 1226 indicates that the FA-3D has a % utilization of 2.7 and has an average queue depth of 4.5.

The table 1227 includes an entry for each related FA port or front-end director port. The table 1227 includes a first column 1227a denoting the FA port names, a second column 1227b denoting % Utilizations, and a third column 1227c denoting IOPS (corresponding to front-end or host IOPS received at an FA port). For example, the entry 1228 indicates that the port FA-1D:4 (e.g., a target port of the FA-1D) has a % utilization of 93.0 and has an IOPS of 1.2; and the entry 1229 indicates that the port FA-3D:4 (e.g., target port of the FA-3D) has a % utilization of 3.0 and has an IOPS of 1.1.

In at least one embodiment, the metrics of the tables 1224 and 1227 of the related FAs and related FA ports for SG1 can be further analyzed to determine whether the metrics indicate resource contention of such related FAs and/or FA ports as an expected cause of the performance alert for SG1.

In connection with the metrics of the tables 1224 and 1227, assume that resource contention processing, such as performed by one of the trained models, classifies only the target FA port FA-1D:4 (having the workloads as denoted by the entry 1228 of the table 1227) as having a resource contention and thus an expected cause of SG1's performance alert. In this case, the trained model that classifies the FA port FA-1D:4 as having a resource contention can determine using one or more rules of the model that the % utilization of the target port FA-1D:4 is 93% and exceeds a specified threshold denoting a resource contention exists.

In at least one embodiment, the information of the example 1220 can be included in either the noisy neighbor report or the resource contention report.

Figure 12:
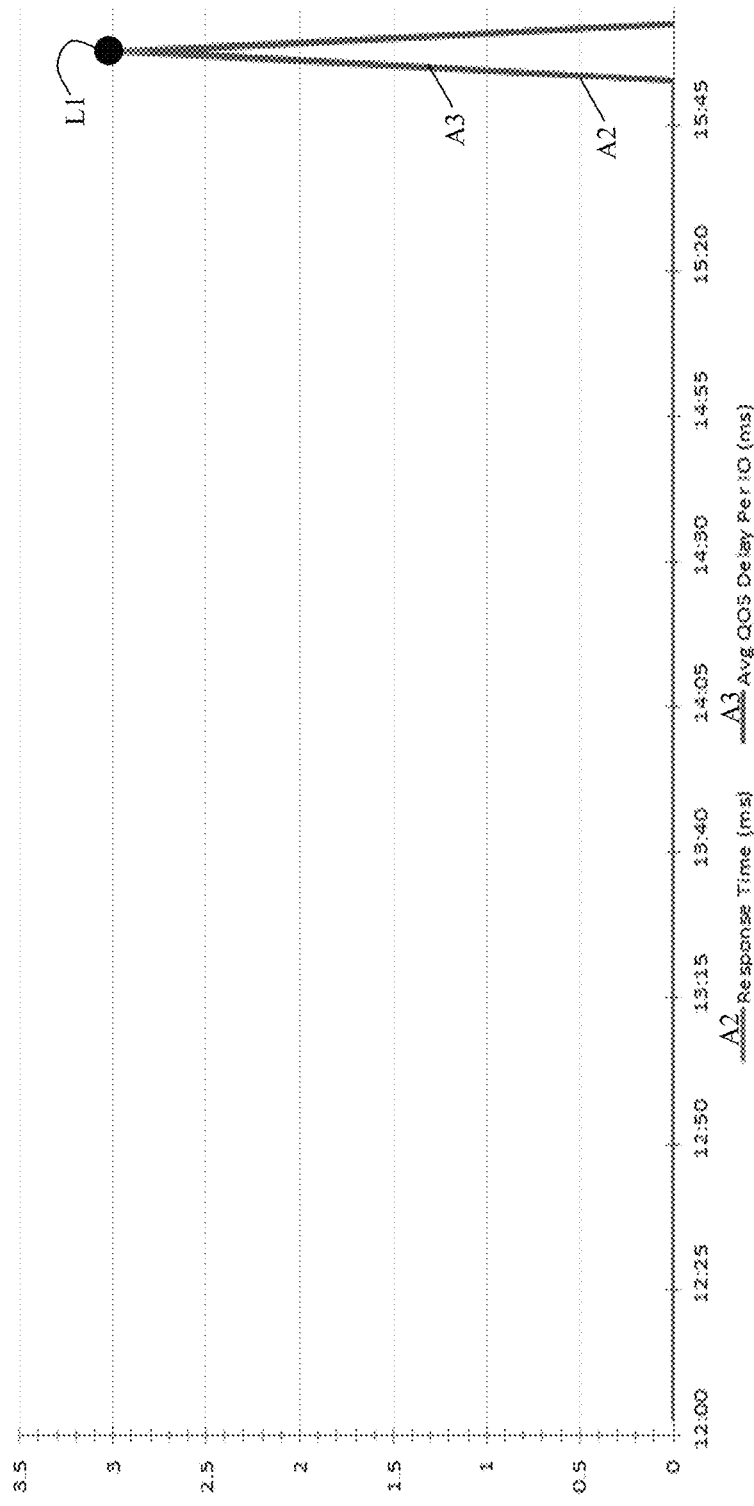

Referring to FIG. 12, shown is an example 1300 of information that can be included in a QOS impact report in at least one embodiment in accordance with the techniques of the present disclosure.

The graph 1300 denotes the average QOS delay per I/O on the Y axis versus time on the X axis. The time period or window denoted on the X axis corresponds to the same time period used in connection with the FIGS. 6-11. Consistent with other discussion herein in at least one embodiment, the average QOS delay per I/O for SG1 can denote the average amount of time an I/O directed to a LUN in SG1 waits in a queue to be serviced. In the graph 1300, the lines A2 and A3 corresponding, respectively, to SG1's RT and SG1's average QOS delay per I/O are superimposed or overlay one another and so appear as a single line. As illustrated in the graph 1300, there is a recent spike or large increase in the QOS delay per I/O for SG1 where the spike in QOS delay per I/O for SG1 also correlates to the spike in RT for SG1 (e.g., see L1 and B1 of FIG. 6) that triggered the performance alert for SG1.

In connection with the average QOS delay per I/O for SG1 as illustrated in the example 1300, assume that QOS processing, such as performed by one of the trained models, classifies the recent spike in measured average QOS delay per I/O for SG1 as a QOS problem or issue which is an expected cause of SG1's performance alert. In this case, the trained model includes one or more rules that classify the spike in measured average QOS delay per I/O for SG1 as a QOS problem or issue. For example, one of the rules of the trained model can determine that the average QOS delay per I/O for SG1 as denoted by the spike at the point L1 in the graph 1300 exceeds a specified threshold denoting a QOS problem exists which impacts the generated alert.

In at least one embodiment, anomaly detection can be further performed on the average QOS delay per I/O for SG1 as denoted by the spike at the point L1 in the graph 1300. If the anomaly detection determines that the current average QOS delay per I/O for SG1 at the point in time L1 for SG1 is an anomaly denoting an increase with respect to the normal behavior or pattern of the metric for SG1, then the average QOS delay per I/O for SG1 at the point in time L1 for SG1 can be determined as a QOS problem which is an expected cause of SG1's performance alert that occurred at, or approximately at (e.g. within a specified tolerance), the point in time denoted by L1. Otherwise, if the anomaly detection determines that the current average QOS delay per I/O for SG1 at the point in time L1 for SG1 is not an anomaly denoting an increase with respect to the normal behavior or pattern of the metric for SG1, then the average QOS delay per I/O for SG1 at the point in time L1 for SG1 can be determined as not a QOS problem and is therefore not an expected cause of SG1's performance alert.

Figure 13:

Referring to FIG. 13, shown is an example 1400 of information that can be included in a resource contention report in at least one embodiment in accordance with the techniques of the present disclosure.

The example 1400 illustrates a heatmap showing component utilization as a percentage for those components shared between SG1 and other SGs. The components include FA directors, FA or front-end ports, total cache, backend (BE) ports of DAs, and boards. In this example, the heatmap illustrates only % utilization of the FA directors and FA ports that are shared or related for SG1 as discussed above in connection with FIG. 11. The element 1420 includes keys A-J each denoting different % utilization ranges. For example, a component labeled as A includes a % utilization in the range from 1-10, a component labeled as B includes a % utilization in the range from 11-20, a component labeled as C includes a % utilization in the range from 21-30, a component labeled as D includes a % utilization in the range from 31-40, a component labeled as E includes a % utilization in the range from 41-50, a component labeled as F includes a % utilization in the range from 51-60, a component labeled as G includes a % utilization in the range from 61-70, a component labeled as H includes a % utilization in the range from 71-80, a component labeled as I includes a % utilization in the range from 81-90, and a component labeled as J includes a % utilization in the range from 91-100.

Four components are labeled in the example 1400 with % utilization keys 1402, 1404, 1406 and 1408. The four components that are labeled correspond to the 2 related FA directors and the 2 related FA ports described in connection with FIG. 11. The label 1402 indicates that the front-end director or FA, FA:1D, has a utilization key of C. The label 1404 indicates that the FA port FA:ID:4 has a utilization key of J denoting the highest utilization range. The label 1406 indicates that the front-end director or FA, FA:3D, has a utilization key of A. The label 1408 indicates that the FA port FA:3D:4 has a utilization key of A.

Figure 14:
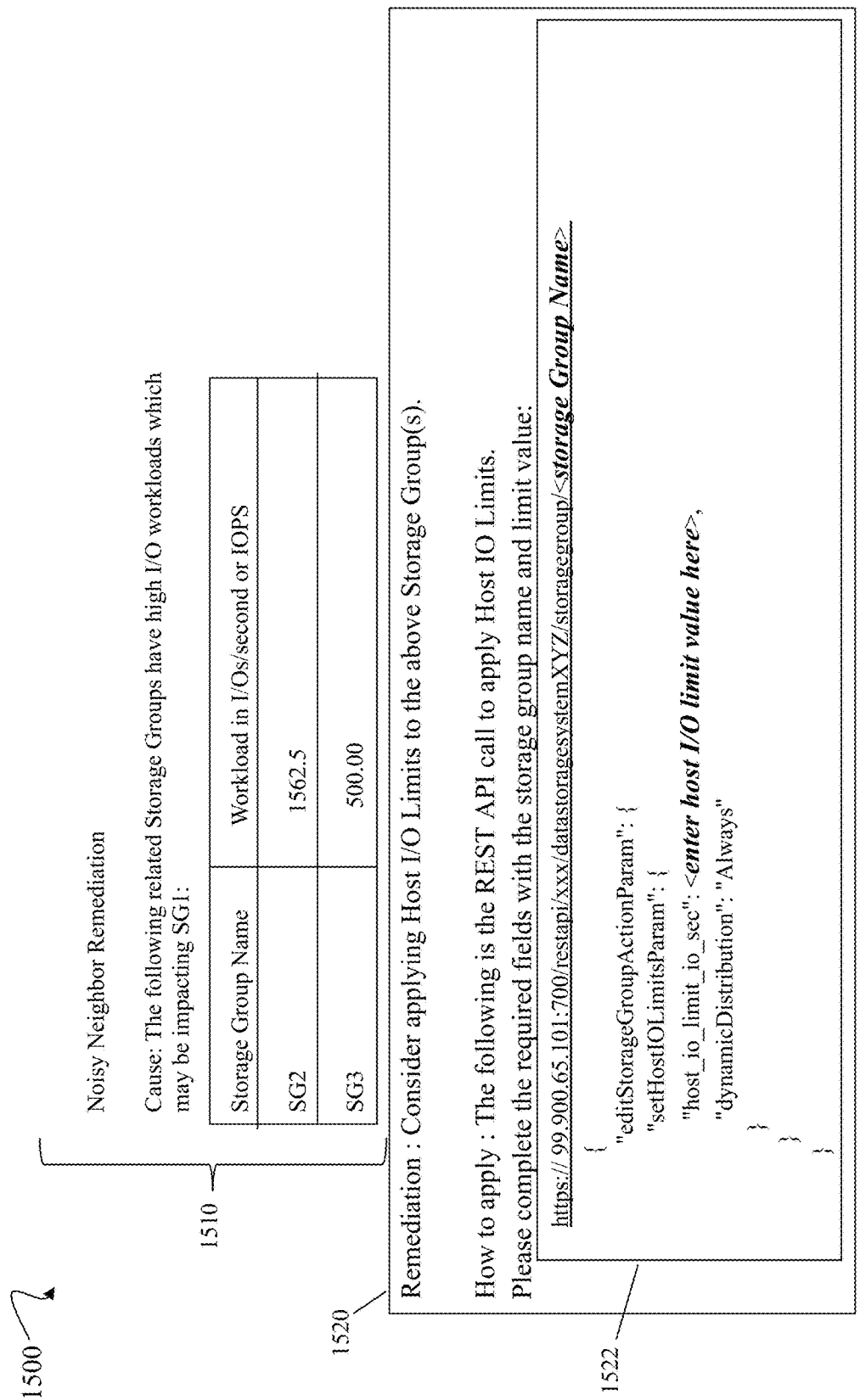

What will now be described in connection with FIGS. 14-16 are examples illustrating remediation actions that can be determined in at least one embodiment in accordance with the techniques of the present disclosure.

Referring to FIG. 14, shown is an example 1500 illustrating information that can be generated in connection with a recommended noisy neighbor remediation. The remediation illustrated in the example 1500 is in accordance with the prior determination as discussed above (e.g., in connection with the example 1200) that the noisy neighbors SG2 and SG3 are expected causes for SG1's performance alert.

The element 1510 indicates that the SG2 and SG3 have been determined as having high workloads impacting SG1 and are thus expected causes of SG1's performance alert. In particular, the element 1510 can include the particular workload metric of IOPS (e.g., as described in connection with the column 1221c of the table 1212 of FIG. 10) which resulted in classifying the SG2 and SG3 as noisy neighbors of SG1.

The element 1520 describes the particular remediation determined for the noisy neighbor classification based on the IOPS workload metric. As illustrated in the element 1520, the remediation is to apply host I/O limits on one or more of the noisy neighbors SG2 and SG3. In at least one embodiment, a host I/O limit can denote a maximum allowable number of front-end or host IOPS that can be issued to a particular SG. In at least one embodiment, the host I/O limits is a feature that can be used to limit the amount of front-end (FE) bandwidth and/or IOPS that can be consumed by an SG. This feature allows the user to place limits on the FE bandwidth and/or IOPs consumed by applications sending I/Os to LUNs of a particular SG exposed over target FA ports of the data storage system. In the example 1500, current measured values of the IOPS workload metric (as denoted by 1510) for both SG2 and SG3 are determined to have exceeded a threshold workload denoting a noisy neighbor. As a result, the recommended remediation of 1520 imposes a maximum limit on the IOPS allowed for one or more of SG2 and SG3. The element 1522 provides instructions of how the remediation action can be implemented using a REST (Representational State Transfer) API.

In at least one embodiment, the remediation action 1522 can be implemented automatically, such as in response to a user selection or other indication to proceed with the remediation action. The inputs needed for the action 1522 can be user specified or otherwise provided automatically based on a default value. For example, the revised host I/O limit for IOPS for SG2 and/or SG3 can be automatically determined by decreasing a currently specified IOPS limit by a predetermined amount. The predetermined amount can be an absolute quantity such as expressed using a positive integer value. The predetermined amount can be based on a percentage of the current IOPS limit of the SG. For example, if the IOPS limit for SG2 is 100, the predetermined amount can be 10% of the current IOPS limit of 100 whereby the revised IOPS limit is 90. If there is currently no IOPS limit set for the SG such as SG2, then another default value can be specified and used as the current IOPS limit for SG2.

Referring to FIG. 15, shown is an example 1600 illustrating information that can be generated in connection with a recommended QOS impact remediation. The remediations illustrated in the example 1600 are in accordance with the prior determination as discussed above (e.g., in connection with the example 1300) where the average QOS delay per I/O for SG1 is determined to be an expected cause for SG1's performance alert.

The element 1610 indicates that the SG1 has a silver service level and that SG1's RT is being impacted by SG2 and SG3 both having a higher diamond service level.

The element 1620 describes the particular remediations determined for the QOS impact or problem classification. As illustrated in the element 1620, a first remediation is increasing SG1's service level to a higher service level such as gold, platinum or diamond. The element 1622 provides instructions of how the first remediation action to raise SG1's service level can be implemented using a REST API.

In at least one embodiment, the remediation action 1622 can be implemented automatically, such as in response to a user selection or other indication to proceed with the remediation action. The information needed to implement the action 1622, such as providing a revised higher service level for SG1, can be user specified or otherwise selected automatically based on a default. For example, the current default can be to select the highest service level, or alternatively increase SG1's service level by one classification (e.g., such as from silver to gold).

The element 1620 also includes a second remediation action that indicates to further tune or modify the service levels of other storage groups such as those of the noisy neighbors SG2 and SG3. For example, one option is to lower the service level of one or both of SG2 and SG3 from diamond to another lower service level which might result in an increase in RT performance for SG1.

It should be noted that implemented remediation actions for the QOS can include a combination of both the first and second remediations of 1620. For example, the service level of SG1 can be increased from silver to a higher service level, and the service level of SG2 and/or SG3 can be lowered from diamond to any of platinum, gold, silver or bronze.

Referring to FIG. 16, shown is an example 1700 illustrating information that can be generated in connection with a recommended resource contention remediation. The remediation illustrated in the example 1700 is in accordance with the prior determination as discussed above (e.g., in connection with the example 1220) that the overloaded FA port FA:1D:4 (e.g., having a utilization and/or workload above a specified threshold) is an expected cause for SG1's performance alert.

The element 1710 indicates that the related or shared target FA port FA:1D:4 (e.g., shared by SG1 and one or more other SGs) has a high utilization indicating that it is overloaded and denotes a resource contention between SG1 and one or more of the other SGs sharing or using the same port.

The element 1720 describes the particular remediation determined for the resource contention classification. As illustrated in the element 1720, a remediation is to add another less utilized FA port to the TPG used by SG1. The TPG for SG1 includes the overloaded shared target port FA:1D:4 and the remediation is to increase the capability of the TPG by adding another FA port currently having little or no utilization. The information of 1700 generated for the resource contention remediation can also include the table 1721 identifying the least busy FA ports as candidates to be added to SG1's TPG. The element 1722 provides instructions of how the foregoing remediation action to add another FA port to SG1's TPG can be implemented using a REST API.

In at least one embodiment, the remediation action 1722 can be implemented automatically, such as in response to a user selection or other indication to proceed with the remediation action. As indicated by 1722, inputs such as the name of the FA port to be added to SG1's TPG, can be user provided or selected. Alternatively, automated processing can provide for automatically selecting one or more of the least busy FA ports to add to SG1's TPG.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
generating, using a processor, an alert regarding an entity in a system, wherein the system includes a plurality of storage groups including a first storage group of logical devices and including one or more other storage groups of logical devices, wherein each of the plurality of storage groups includes logical devices with corresponding storage capacity configured from physical storage devices of the system, wherein the entity is the first storage group;
performing, using a processor, anomaly detection on the alert to determine whether the alert indicates a first anomaly with respect to historical data for a specified metric for the entity;
responsive to determining that the alert indicates the first anomaly with respect to the historical data for the specified metric for the entity, performing first processing including:
receiving, using a processor, notification of the alert regarding the entity in the system;
responsive to receiving the notification, performing second processing including:
receiving, using a processor, one or more expected causes of the alert wherein the one or more expected causes are determined in accordance with one or more rules and in accordance with an input including one or more metrics characterizing any of quality of service, performance, resource usage and workload of one or more entities of the system, wherein the input includes first configuration information identifying first shared resources that are shared by the first storage group and by the one or more other storage groups, wherein the first shared resources include a first storage system port, wherein first logical devices of the first storage group and second logical devices of the one or more other storage groups are exposed over a same port, the first storage system port, such that first I/Os directed to the first logical devices and second I/Os directed to the second logical devices are both received at the first storage system port, wherein the alert includes an adverse performance violation for the first storage group, wherein the one or more expected causes of the adverse performance violation include a first expected cause identifying a second storage group of the one or more other storage groups as a noisy neighbor of the first storage group where a respective I/O workload of the second storage group is an expected cause of the adverse performance violation of the first storage group;
receiving, using a processor, one or more remediations that are determined in accordance with the one or more expected causes of the alert, wherein the one or more remediations denote one or more corresponding actions that alleviate or remove the one or more expected causes of the alert wherein the one or more remediations include a first remediation that alleviates or removes the first expected cause of the adverse performance violation; and
implementing the first remediation in the system, including reducing a first host I/O limit setting for the second storage group to thereby decrease a maximum allowable front-end or host I/O rate of the second storage group on the system;
and
responsive to determining that the alert does not indicate the first anomaly with respect to the historical data for the specified metric for the entity, determining using a processor that the alert denotes a false alarm and not generating said notification of the alert.

2. The computer-implemented method of claim 1, further comprising:
determining the one or more expected causes, wherein said determining the one or more expected causes is performed by a classification engine that uses the one or more rules to classify the alert into one or more classifications each indicating one of the one or more expected causes of the alert.

3. The computer-implemented method of claim 2, further comprising:
determining the one or more remediations, wherein said determining the one or more remediations is performed by a remediation service that maps the one or more expected causes to the one or more remediations.

4. The computer-implemented method of claim 2, further comprising:

generating the alert which indicates that a specified metric for the entity does not meet one or more specified conditions.

5. The computer-implement method of claim 4, further comprising:
determining that a current value of the specified metric for the first storage group violates a specified performance target of the first storage group; and
responsive to determining that the current value of the specified metric for the first storage group violates the specified performance target of the first storage group, performing said generating the alert.

6. The computer-implemented method of claim 5, wherein the specified metric is I/O response time.

7. The computer-implement method of claim 5, wherein the classification engine includes one or more machine learning models trained to classify the input into one or more classifications denoting one or more expected causes of alerts, and wherein each of the one or more machine learning models is trained to determine whether or not information included in the input denotes a corresponding one of the one or more expected causes of alerts.

8. The computer-implement method of claim 7, wherein each of the one or more machine learning models is a decision tree including one or more rules that determine whether information included in the input denotes a corresponding one of the one or more expected causes of alerts.

9. The computer-implemented method of claim 7, wherein the input further includes configuration information describing resources of the system configured for use by each entity of the system, wherein said configuration information includes information identifying one or more shared resource of the system where each of the one or more shared resources are configured for use by two or more entities of the system, and wherein the one or more metrics includes a first set of one or more I/O workload metrics regarding a second entity related to the entity where the configuration information indicates that the second entity shares at least one resource with the entity, and wherein the one or more machine learning models includes a machine learning model that performs processing that determines which alerts are caused by a noisy neighbor which shares resources with one or more other entities in the system, said processing including:
determining, in accordance with the first set of one or more I/O workload metrics and the configuration information, whether the second entity is a noisy neighbor of the entity having the alert;
responsive to determining that the second entity is a noisy neighbor of the entity, determining that the second entity has an associated I/O workload, as characterized by the first set of one or more I/O workload metrics, which is an expected cause of the alert of the entity; and
responsive to determining that the second entity is not a noisy neighbor of the entity, determining that the second entity does not have an associated I/O workload, as characterized by the first set of one or more I/O workload metrics, which is an expected cause of the alert of the entity.

10. The method of claim 9, wherein the one or more I/O workload metrics of the first set characterizing the second entity include one or more of: an I/O operation throughput rate and a data throughput rate.

11. The computer-implemented method of claim 7, wherein the input further includes configuration information describing resources of the system configured for use by each entity of the system, wherein said configuration information includes information identifying one or more shared resource of the system where each of the one or more shared resources are configured for use by two or more entities of the system, and wherein the one or more metrics include a first set of one or more metrics regarding a first of the shared resources which is shared by the entity and at least one other entity, wherein the first set or one or more metrics characterize one or more of: resource usage of the first shared resource and workload of the first shared resource, and wherein the one or more machine learning models includes a machine learning model that performs processing that determines which alerts are caused by a resource contention in the system, said processing including:
determining, in accordance with the first set of one or more metrics and the configuration information, whether there is a first resource contention for the first shared resource between the entity and at least one other entity sharing the first shared resource;
responsive to determining that there is the first resource contention for the first shared resource between the entity and at least one other entity sharing the first shared resource, determining that the first resource contention for the first shared resource is an expected cause of the alert of the entity; and
responsive to determining that there is no resource contention for the first shared resource between the entity and at least one other entity sharing the first shared resource, determining that the first resource contention for the first shared resource is not an expected cause of the alert of the entity.

12. The computer-implemented method of claim 11, wherein the first resource contention for the first shared resource, between the entity and at least one other entity sharing the first shared resource, is determined to be an expected cause of the alert of the entity, and wherein the computer-implemented method further comprises:
determining, in accordance with the first resource contention, a first of the one or more remediations that includes adding one or more additional resources to a resource group of resources used by the entity.

13. The computer-implemented method of claim 7, wherein the one or more metrics includes a first set of one or more metrics including a first quality of service metric of the entity, and wherein the one or more machine learning models includes a machine learning model that performs processing that determines which alerts are caused by a quality of service problem of the entity, said processing including:
determining, in accordance with the first set of one or more metrics, whether there is a first quality of service problem for the entity;
responsive to determining that there is the first quality of service problem for the entity, determining that a current quality of service level for the entity is an expected cause for the alert of the entity; and
responsive to determining that there is no quality of service problem for the entity, determining that the current quality of service level for the entity is not an expected cause for the alert of the entity.

14. The computer-implemented method of claim 13, wherein the first quality of service metric for the entity, which is the storage group, denotes an average delay that I/Os, which are directed to the one or more logical device of the storage group, wait for servicing.

15. The computer-implemented method of claim 14, wherein the current quality of service level for the entity is determined to be an expected cause of the alert of the entity, and wherein the computer-implemented method further includes:
  determining, in accordance with the current service level of the entity, a revised service level of the entity, wherein the revised service level indicates a higher level of service for the entity than the current service level of the entity.

16. The computer-implemented method of claim 13, wherein the one or more metrics includes a first set of one or more metrics regarding a current workload of a corresponding one of: the entity associated with the alert or another entity of the system, and wherein the one or more learning models includes a machine learning model that performs processing that determines which alerts are caused by overloaded entities in the system, said processing including:
  determining, in accordance with the first set of one or more metrics, whether the current workload indicates that the corresponding one of the entity or another entity of the system is overloaded;
  responsive to determining that the current workload indicates that the corresponding one of the entity or another entity of the system is overloaded, determining that the current workload of the corresponding one of the entity or another entity of the system which is overloaded is an expected cause for the alert of the entity; and
  responsive to determining that the current workload does not indicate the corresponding one of the entity or another entity of the system is overloaded, determining that the current workload of the corresponding one of the entity or another entity of the system is not an expected cause for the alert of the entity.

17. A system comprising:
one or more processors; and
a memory comprising code stored thereon that, when executed by at least a first of the one or more processors, performs a method comprising:
  generating, using a processor, an alert regarding an entity in a system, wherein the system includes a plurality of storage groups including a first storage group of logical devices and including one or more other storage groups of logical devices, wherein each of the plurality of storage groups includes logical devices with corresponding storage capacity configured from physical storage devices of the system, wherein the entity is the first storage group;
  performing, using a processor, anomaly detection on the alert to determine whether the alert indicates a first anomaly with respect to historical data for a specified metric for the entity;
  responsive to determining that the alert indicates the first anomaly with respect to the historical data for the specified metric for the entity, performing first processing including:
    receiving, using a processor, notification of the alert regarding the entity in the system;
    responsive to receiving the notification, performing second processing including:
      receiving, using a processor, one or more expected causes of the alert, wherein the one or more expected causes are determined in accordance with one or more rules and in accordance with an input including one or more metrics characterizing any of quality of service, performance, resource usage and workload of one or more entities of the system, wherein the input includes first configuration information identifying first shared resources that are shared by the first storage group and by the one or more other storage groups, wherein the first shared resources include a first storage system port, wherein first logical devices of the first storage group and second logical devices of the one or more other storage groups are exposed over a same port, the first storage system port, such that first I/Os directed to the first logical devices and second I/Os directed to the second logical devices are both received at the first storage system port, wherein the alert includes an adverse performance violation for the first storage group, wherein the one or more expected causes of the adverse performance violation include a first expected cause identifying a second storage group of the one or more other storage groups as a noisy neighbor of the first storage group where a respective PO workload of the second storage group is an expected cause of the adverse performance violation of the first storage group;
      receiving, using a processor, one or more remediations that are determined in accordance with the one or more expected causes of the alert, wherein the one or more remediations denote one or more corresponding actions that alleviate or remove the one or more expected causes of the alert, wherein the one or more remediations include a first remediation that alleviates or removes the first expected cause of the adverse performance violation; and
      implementing the first remediation in the system, including reducing a first host I/O limit setting for the second storage group to thereby decrease a maximum allowable front-end or host I/O rate of the second storage group on the system; and
  responsive to determining that the alert does not indicate the first anomaly with respect to the historical data for the specified metric for the entity, determining using a processor that the alert denotes a false alarm and not generating said notification of the alert.

18. A non-transitory computer readable medium comprising code stored thereon that, when executed by a processor, performs a method comprising:
  generating, using a processor, an alert regarding an entity in a system, wherein the system includes a plurality of storage groups including a first storage group of logical devices and including one or more other storage groups of logical devices, wherein each of the plurality of storage groups includes logical devices with corresponding storage capacity configured from physical storage devices of the system, wherein the entity is the first storage group;
  performing, using a processor, anomaly detection on the alert to determine whether the alert indicates a first anomaly with respect to historical data for a specified metric for the entity;
  responsive to determining that the alert indicates the first anomaly with respect to the historical data for the specified metric for the entity, performing first processing including:
    receiving, using a processor, notification of the alert regarding the entity in the system;

responsive to receiving the notification, performing second processing including:

receiving, using a processor, one or more expected causes of the alert wherein the one or more expected causes are determined in accordance with one or more rules and in accordance with an input including one or more metrics characterizing any of quality of service, performance, resource usage and workload of one or more entities of the system, wherein the input includes first configuration information identifying first shared resources that are shared by the first storage group and by the one or more other storage groups, wherein the first shared resources include a first storage system port, wherein first logical devices of the first storage group and second logical devices of the one or more other storage groups are exposed over a same port, the first storage system port, such that first I/Os directed to the first logical devices and second I/Os directed to the second logical devices are both received at the first storage system port, wherein the alert includes an adverse performance violation for the first storage group, wherein the one or more expected causes of the adverse performance violation include a first expected cause identifying a second storage group of the one or more other storage groups as a noisy neighbor of the first storage group where a respective I/O workload of the second storage group is an expected cause of the adverse performance violation of the first storage group;

receiving, using a processor, one or more remediations that are determined in accordance with the one or more expected causes of the alert, wherein the one or more remediations denote one or more corresponding actions that alleviate or remove the one or more expected causes of the alert wherein the one or more remediations include a first remediation that alleviates or removes the first expected cause of the adverse performance violation; and implementing the first remediation in the system, including reducing a first host I/O limit setting for the second storage group to thereby decrease a maximum allowable front-end or host I/O rate of the second storage group on the system;

and responsive to determining that the alert does not indicate the first anomaly with respect to the historical data for the specified metric for the entity, determining using a processor that the alert denotes a false alarm and not generating said notification of the alert.

* * * * *

UNITED STATES PATENT AND TRADEMARK OFFICE
CERTIFICATE OF CORRECTION

| | | |
|---|---|---|
| PATENT NO. | : 11,994,941 B2 | Page 1 of 1 |
| APPLICATION NO. | : 17/483007 | |
| DATED | : May 28, 2024 | |
| INVENTOR(S) | : Lisa O'Mahony | |

It is certified that error appears in the above-identified patent and that said Letters Patent is hereby corrected as shown below:

In the Claims

Column 40, Line 21:
In Claim 17, the phrase "respective PO workload"
Should read:
-- respective IO workload --

Signed and Sealed this
Sixteenth Day of July, 2024

Katherine Kelly Vidal
*Director of the United States Patent and Trademark Office*